United States Patent
Choi

(10) Patent No.: US 8,855,481 B2
(45) Date of Patent: Oct. 7, 2014

(54) APPARATUS AND METHOD FOR PHOTOGRAPHING TIMER CONTROL OF A CAMERA OF A TERMINAL

(71) Applicant: Pantech Co., Ltd., Seoul (KR)

(72) Inventor: Hong Min Choi, Seoul (KR)

(73) Assignee: Pantech Co., Ltd., Seoul (KR)

( * ) Notice: Subject to any disclaimer, the term of this patent is extended or adjusted under 35 U.S.C. 154(b) by 0 days.

(21) Appl. No.: 13/793,691

(22) Filed: Mar. 11, 2013

(65) Prior Publication Data

US 2014/0016921 A1   Jan. 16, 2014

(30) Foreign Application Priority Data

Jul. 10, 2012 (KR) .............. 10-2012-0074902

(51) Int. Cl.
   *G03B 17/40* (2006.01)
   *H04N 5/225* (2006.01)

(52) U.S. Cl.
   CPC ............. *G03B 17/40* (2013.01); *H04N 5/225* (2013.01)
   USPC ........................................................ 396/264

(58) Field of Classification Search
   CPC ..................................................... G03B 17/40
   USPC ........................................................ 396/264
   See application file for complete search history.

(56) References Cited

U.S. PATENT DOCUMENTS

| | | | |
|---|---|---|---|
| 2008/0084398 A1* | 4/2008 | Ito et al. | 345/173 |
| 2008/0204402 A1* | 8/2008 | Hirata et al. | 345/156 |
| 2012/0011456 A1* | 1/2012 | Noda et al. | 715/769 |

FOREIGN PATENT DOCUMENTS

| | | |
|---|---|---|
| JP | 2006-078663 | 3/2006 |
| JP | 2010-028364 | 2/2010 |
| KR | 10-2011-0064044 | 6/2011 |

* cited by examiner

*Primary Examiner* — W B Perkey
(74) *Attorney, Agent, or Firm* — H.C. Park & Associates, PLC

(57) ABSTRACT

Terminals, methods, and apparatuses for controlling a photographing timer of a camera operating in a terminal, such as a mobile terminal, including a photographing timer control apparatus, and may include: a display unit to display a photographing icon on the terminal to set a time for a photographing timer of a camera of the terminal, a timer value computing unit to compute or determine a self-timer value based on a touch duration of a touch input on the photographing icon when the touch input is provided at a position corresponding to the photographing icon, and a control unit to control a photographing operation of the photographing timer of the camera of the terminal, based on the self-timer value computed or determined by the timer value computing unit.

27 Claims, 15 Drawing Sheets

APPARATUS AND METHOD FOR PHOTOGRAPHING TIMER CONTROL OF A CAMERA OF A TERMINAL

CROSS-REFERENCE TO RELATED APPLICATION

This application claims priority to and the benefits under 35 U.S.C. §119 of Korean Patent Application No. 10-2012-0074902, filed on Jul. 10, 2012, the contents of which are herein incorporated in its entirety by reference for all purposes as if fully set forth herein.

BACKGROUND

1. Field

Exemplary embodiments of the present invention include terminals, apparatuses and methods for controlling a photographing timer of a camera operating in a terminal, such as a mobile terminal.

2. Discussion of the Background

In the related art, a process of entering a separate setting menu, setting a timer photographing operation and a desired time, and pressing a shutter button on a preview screen of a terminal may be performed to use the timer photographing function of a camera in the terminal.

Typically, in order to use the timer photographing operation or function of the camera of the terminal, a process of entering a separate setting menu, determining a desired time to be set for a timer, and operating the timer on a separate preview screen may be requested to be performed. And, in this regard, moving among a number of pages on the screen of the terminal may be necessary and thus, additional time may be expended accordingly, to perform the timer photographing operation.

Accordingly, problems or drawbacks may exist related to the amount of time needed or a type or number of operations for timer photographing operations, such as in adjusting a time to be set for the timer, that may also use a separate setting page, when photographing is performed using the camera of the terminal.

SUMMARY

Exemplary embodiments of the present invention provide terminals, apparatuses and methods for controlling a photographing timer of a camera operating in a terminal, such as a mobile terminal.

Exemplary embodiments relate to a terminal to control operation of a photographing timer of a camera of the terminal, including: a display unit to display a photographing icon to set a time for a photographing timer; a timer value computing unit to determine a self-timer value for the photographing timer based on at least one of a touch duration of a touch input received on the photographing icon, a location at a position at which the touch input is detected, and a location at a position at which the touch input is terminated; and a control unit to control the operation of the photographing timer of the camera of the terminal based on the determined self-timer value.

Exemplary embodiments also relate to a method for controlling operation of a photographing timer of a camera of a terminal, including: displaying a photographing icon for a photographing timer; determining a touch duration of a touch input received on the photographic icon; determining a location at a position at which the touch input is detected and a location at a position at which the touch input on the photographing icon is terminated; and determining a self-timer value for the photographing timer based on at least one of the determined touch duration, the determined location at the position at which the touch input is detected, and the determined location at the position at which the touch input is terminated.

Exemplary embodiments further relate to a method for controlling operation of a photographing timer of a camera of a terminal, including: detecting a received touch input on a photographing icon to set a time for a photographing timer; detecting a touch release of the touch input on the photographing icon; obtaining coordinates of a location at a position at which the touch input is detected and coordinates of the location at the position at which the touch release is detected; determining a distance between the obtained coordinates of the location at the position at which the touch input is detected and the obtained coordinates of the location at the position at which the touch release is detected; and determining a self-timer value to control the operation of the photographing timer of the camera of the terminal based on the determined distance.

Exemplary embodiments additionally relate to a method for controlling operation of a photographing timer of a camera of a terminal, including: detecting a received touch input on a photographing icon to set a time for a photographing timer; operating a timer when the touch input on the photographing icon is detected; determining if a touch release of the touch input on the photographing is detected; terminating the operation of the timer when it is determined that the touch release of the touch input on the photographing icon is detected; and determining a self-timer value from the timer corresponding to a value of the timer when the operation of the timer is terminated to control the operation of the photographing timer of the camera of the terminal based on the determined self-timer value.

Additional features of the invention will be set forth in the description which follows, and in part will be apparent from the description, or may be learned by practice of the invention.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
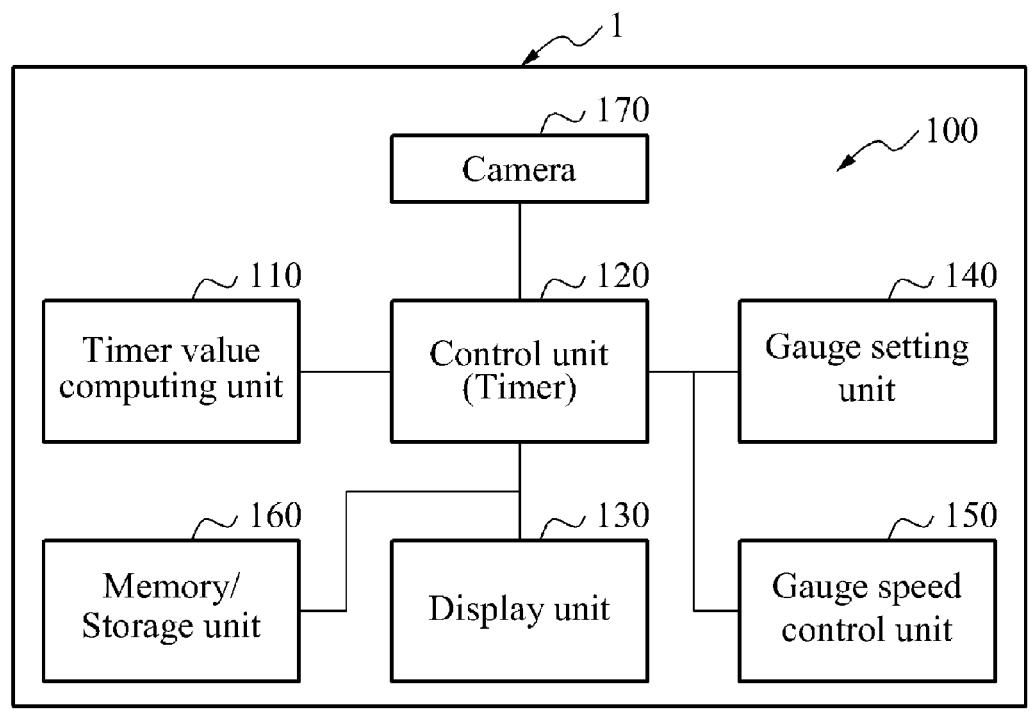
FIG. 1 is a block diagram illustrating a photographing timer control apparatus according to exemplary embodiments of the present invention.

The invention is described more fully hereinafter with reference to the accompanying drawings, in which embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements. Hereinafter, exemplary embodiments of terminals, apparatuses and methods for controlling a photographing timer operation of a camera of a terminal will be described in more detail with reference to the drawings.

It will be understood that when an element is referred to as being "connected to" another element, it can be directly connected to the other element, or intervening elements may be present and, as to wireless communication, may also be interpreted as being wirelessly connected.

Hereinafter, a terminal may include, for example, a terminal, a mobile terminal, a mobile communication terminal, handheld, portable or tablet computer or communication devices, or other apparatuses, to control a photographing timer operation of a camera of a terminal, will be described in more detail with reference to the drawings, and should not be construed in a limiting sense. Also, the terminal and the units, modules; elements and components of the terminals herein described, include hardware and software, and can also include firmware, to perform various functions of the terminal including those for controlling a photographing timer operation of a camera of a terminal, including those described herein, as may be known to one of skill in the art. As such, terminal as used herein should not be construed in a limiting sense and may include the above and other apparatuses for controlling a photographing timer operation of a camera of a terminal.

Also, a terminal may include, for example, any of various devices or structures used for wireless or wired communication and can be wired or wireless connected to a base station, server or network, and may include another terminal, and also may include hardware, firmware, or software to perform various functions or operations for controlling a photographing timer operation of a camera of a terminal, including those described herein, as may be known to one of skill in the art.

Hereinafter, a terminal, such as including, for example, a terminal, mobile terminal, a mobile communication terminal, handheld, portable or tablet computer or communication devices, or other apparatuses, and methods for controlling a photographing timer operation of a camera of a terminal will be described in more detail with reference to the drawings.

FIG. 1 is a block diagram illustrating a photographing timer control apparatus 100 in a terminal 1 according to exemplary embodiments of the present invention.

Referring to FIG. 1, the photographing timer control apparatus 100 may include a timer value computing unit 110, a control unit 120, and a display unit 130. The photographing timer control apparatus 100 may further include a gauge setting unit 140, and a gauge speed control unit 150, a memory/storage unit 160 to store data, applications or programs for operations of the terminal 1 and for operations of the photographing timer control apparatus 100, according to exemplary embodiments. Also, a camera 170 of the terminal 1 for performing photographing operations is associated with the photographing timer control apparatus 100.

The terminal 1 including the camera 170 and the photographing timer control apparatus 100, including the timer value computing unit 110, the control unit 120, the display unit 130, the gauge setting unit 140, the gauge speed control unit 150 and the memory/storage unit 160 are associated with and may include any of various memory or storage media for storing software, program instructions, data files, data structures, and the like, and are associated with and may also include any of various processors, computers or application specific integrated circuits (ASICs) for example, to implement various operations for controlling a photographing timer operation of a camera of a terminal, as described herein.

Figure 2:
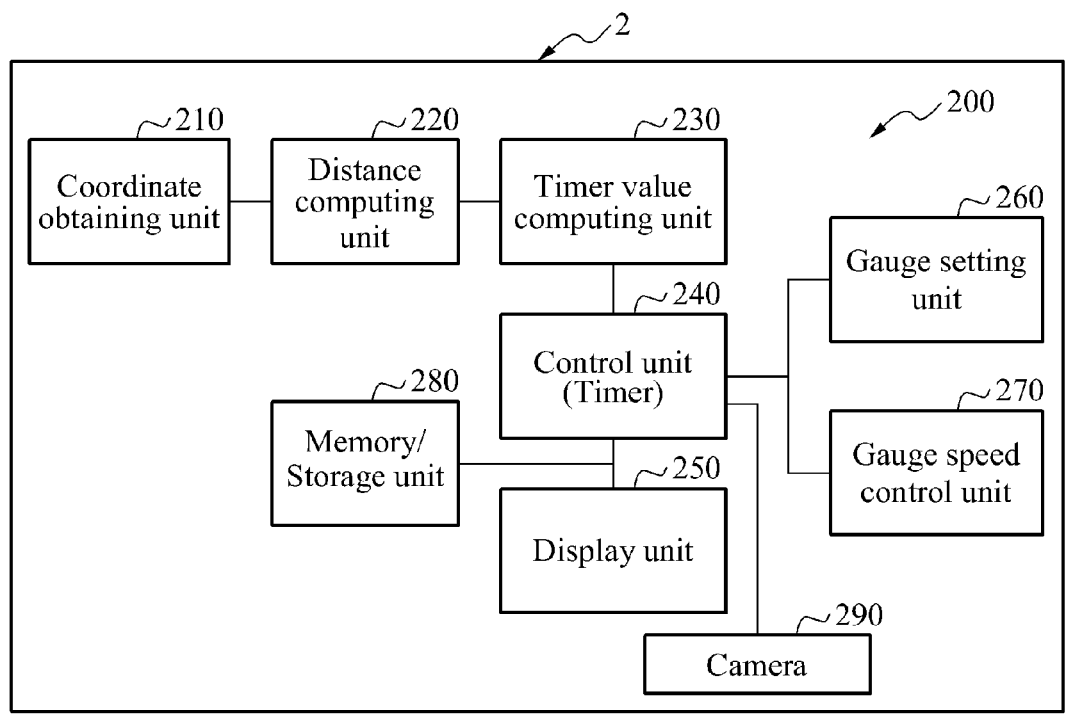
FIG. 2 is a block diagram illustrating a photographing timer control apparatus according to exemplary embodiments of the present invention.
Figure 3:
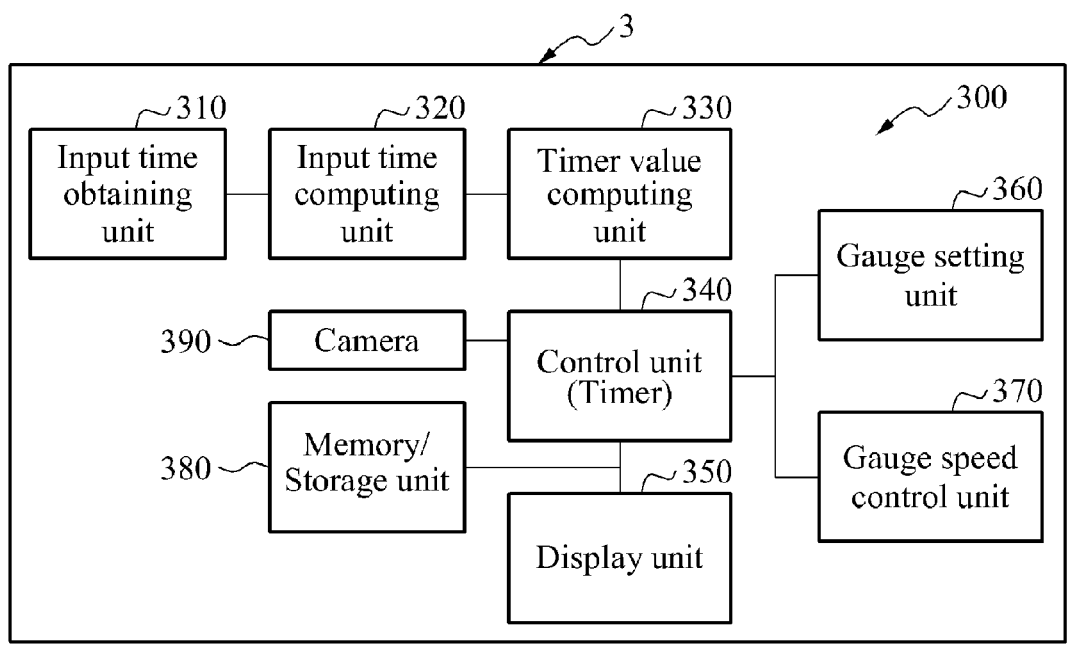
FIG. 3 is a block diagram illustrating a photographing timer control apparatus according to r exemplary embodiments of the present invention.
Figure 4:
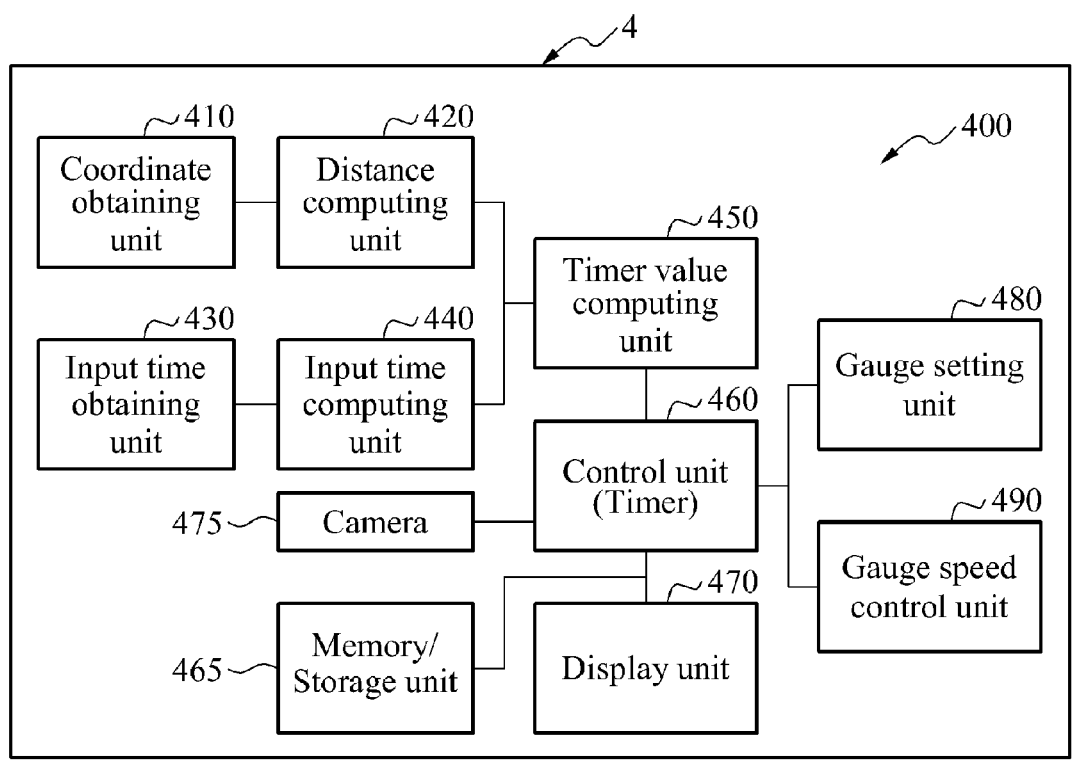
FIG. 4 is a block diagram illustrating a photographing timer control apparatus according to exemplary embodiments of the present invention.

Likewise, the terminals 2, 3 and 4 including the cameras 290, 390 and 475 and the photographing timer control apparatuses 200, 300 and 400 of FIG. 2 to FIG. 4, respectively including the timer value computing units 230, 330, and 450, the control units 240, 340 and 460, the display units 250, 350 and 470, the gauge setting units 260, 360 and 480, the gauge speed control units 270, 370 and 490, the memory/storage units 280, 380 and 465, the coordinate obtaining units 210 and 410, the distance computing units 220 and 420, the input time obtaining units 310 and 430 and the input time computing units 320 and 440 are associated with and may include any of various memory or storage media for storing software, program instructions, data files, data structures, and the like, and are associated with and may also include any of various processors, computers or application specific integrated circuits (ASICs) for example, to implement various operations for controlling a photographing timer operation of a camera of the terminals 2, 3, and 4, as described herein.

And although the terminal 1, the terminal 2 of FIG. 2, the terminal 3 of FIG. 3, and the terminal 4 of FIG. 4, and the cameras, 170, 290, 390 and 475, the photographing timer control apparatuses 100, 200, 300 and 400 of FIG. 1 to FIG. 4, and the herein described units, processors, memories, modules, elements, devices or components of the terminals 1, 2, 3, and 4 and the photographing timer control apparatuses 100, 200, 300 and 400 may be described as separate units, processors, memories, modules, elements, devices or components, aspects are not limited thereto such that each of units, processors, memories, modules, elements, devices or components may be combined with any one or more units, processors, memories, modules, elements, devices or components, for example, and should therefore should not be construed in a limiting sense.

Also, the software, media and program instructions as may be included in or used by the terminals 1, 2, 3 and 4, the cameras 170, 290, 390 and 475, and the photographing timer control apparatuses 100, 200, 300 and 400 may be those specially designed and constructed for the purposes of the present invention, or they may be of the kind well-known and available to those having skill in the computer software arts. Examples of program instructions include both machine code, such as produced by a compiler, and files containing higher level code that may be executed by the computer using an interpreter. The described hardware devices may, for example, include hardware, firmware or other modules to perform the operations of the described embodiments of the present invention.

Continuing with reference to FIG. 1, the timer value computing unit 110 may compute a self-timer value based on a touch duration during which a touch input is maintained when the touch input is provided at a position corresponding to a photographing icon. The photographing icon refers to an icon to activate or perform a camera function or operation of the terminal 1, such as in relation to control operation of a photographing timer of the camera 170 of the terminal 1. The photographing icon may be displayed on a screen on a display unit, such as display unit 130, on the terminal 1. The photographing icon may be displayed on the screen of the terminal 1 configured by a touch interface. The photographing icon may respond to the touch input of the touch interface.

The touch interface may refer to a preview screen of a target viewed through the camera 170 of the terminal 1, on a front display screen of the terminal 1 including a touch integrated circuit (IC). The self-timer value may refer to a time to be used for timer photographing of the camera 170 of the terminal 1. For example, when the computed or determined self-timer value corresponds to three seconds, the photographing may be initiated after three seconds.

The touch duration may refer to a time from a time at which the touch input is provided or received, such as when the touch input to a photographing icon is detected, to a time at which a touch release is detected, in the touch interface of the terminal 1. The touch release may refer to an event of termination of the provided touch input. In addition, the touch duration may refer to a time during which a touch drag input is maintained after the touch input is provided or received, such as when a touch input on the photographing icon is detected. The touch drag input or touch drag may refer to a touch input continuing while a position of the touch input is changed in the touch interface.

The timer value computing unit 110 may compute or determine the self-timer value, based on a difference between a location at a position corresponding to a point at which the received touch input on the photographing icon is detected and a location at a position corresponding to the photographing icon, when the touch release is detected, or a location at a position at which the touch input on the photographing icon is terminated, after the touch input is received or provided, such as when the touch input on the photographing icon is detected, at the location at the position corresponding to the photographing icon, and a touch drag is received or provided on the photographing icon on the touch interface, successively. And, as such, the determined difference may correspond to a distance, for example.

However, such determined difference should not be construed in a limiting sense to only a determined distance between a first location at a first position and a second location at a second position. Such determined difference may, for example, indicate a first value of the self-timer value, such as corresponding to a difference between a first location at a first position and a second location at a second position, and a different second value of the self-timer value between the first location at the first position and a third location at a third position, even though the distance between the first location at the first position and the second location at the second position is the same or substantially the same as the distance between the first location at the first location and the third location at the third position, such as when the second location at the second position and the third location at the third position are in different areas of a screen of the display unit, for example.

The timer value computing unit 110 may compute or determine the self-timer value based on a distance between coordinates of the location at the position corresponding to the photographing icon and coordinates of the location at the position corresponding to the point at which the touch release is detected.

The control unit 120, such as configured as a processor, may control a photographing operation of the terminal 1, such as a photographing timer operation of the camera 170 of the terminal 1, based on the self-timer value computed by the timer value computing unit 110, as well as may control other operations of the terminal 1. For example, when the self-timer value computed or determined by the timer value computing unit 110 corresponds to three seconds, the control unit 120 may count, such as by a timer included in or associated with the control unit 120, three seconds, and may initiate the photographing operation of the camera 170 of the terminal 1 after three seconds, for example.

The display unit 130 may display a process of performing the counting on the screen of the terminal 1. For example, the display unit 130 may display a value of a gauge decreasing, on the screen of the terminal 1. The display unit 130 may display the process of performing the counting in an activated touch interface of the terminal 1. Here, the activated touch interface may refer to a screen on which the photographing function of the camera 170 of the terminal 1 is activated when the touch input is provided on the photographing icon. As another example, the display unit 130 may display a number being counted in the activated touch interface. For example, when the computed self-timer value corresponds to three seconds, the display unit 130 may display a number being counted, for example, 3, 2, 1, and the like, in the activated touch interface, such as on a screen of the display unit 130 of the terminal 1.

The display unit 130 may display, on the terminal 1, at least one of a gauge indicating a self-timer value, and a number directly indicating the self-timer value, for example. The display unit 130 may display, on the terminal 1, a time being counted down from the computed or determined self-timer value. The display unit 130 may display the self-timer value along with the gauge in the activated touch interface, or may display the self-timer value solely, without the gauge, in the activated touch interface, for example, according to exemplary embodiments.

When a touch input and a touch release are provided on the photographing icon within a reference time, photographing may be initiated immediately, or at approximately the same time, without a self-timer operation being performed, for example. When a time from the time at which the touch input is provided on the photographing icon to the time at which the touch release is detected exceeds the reference time, the self-timer operation may be activated. In addition, when a touch drag input is received or provided on the photographing icon, the self-timer operation may be activated.

When the touch input is provided on the photographing icon, the display unit 130 may display a value decreasing from a value of the gauge determined at a point in time at which the touch release is detected. In this regard, the control unit 120 may initiate the photographing operation of the terminal 1 when the value of the gauge decreases to "0." That is, the control unit 120 may activate the camera operation of the terminal 1, based on the self-timer value.

The gauge setting unit 140 may set a difference between the time at which the touch input is received or provided, such as when the touch input on the photographing icon is detected, and the time at which the touch release of the touch input is detected to be an initial value of the gauge. In addition, the gauge setting unit 140 may set a time during which the touch drag input is maintained to be the initial value of the gauge. The initial value may refer to a value from which the value of the gauge is selectively increased or decreased, for example.

The gauge speed control unit 150 may control a speed at which the value of the gauge is selectively increased and decreased from the initial value of the gauge, based on a distance between coordinates of a location at the position at which the touch input is provided or received, such as when the touch input on the photographing icon is detected, and coordinates of a location at the position at which the touch release is detected. For example, when a distance between the coordinates of the location at the position at which the touch input is provided or received, such as when the touch input on the photographing icon is detected, and the coordinates of the location at the position at which the touch release is detected increases, the speed at which the value of the gauge, as the self-timer value, is selectively increased and decreased may increase, for example. Also, for example, when the distance between the coordinates of the location at the position at which the touch input is provided or received, such as when the touch input on the photographing icon is detected, and the coordinates of the location at the position at which the touch release is detected decreases, the speed at which the value of the gauge, as the self-timer value, is selectively increased and decreased may decrease, for example.

The value of the gauge may be increased from the initial value, and may be decreased when the value of the gauge reaches a maximum value. And the selective increasing and decreasing of the value of the gauge may be repeated to adjust the value of the gauge, for example.

The timer value computing unit 110 may compute or determine, as the self-timer value, a timer value mapped to an area in which the touch release is detected. A timer value may be mapped in advance, for each area of the touch interface.

The timer value computing unit 110 may compute or determine, as the self-timer value, a value of the gauge determined at a point in time at which the touch release is detected, such as when the value of the gauge indicating the self-timer value is selectively increased and decreased repeatedly to adjust the value of the gauge after the touch input is provided or received, such as when the touch input on the photographing icon is detected.

When the touch input is provided or received, such as when the touch input on the photographing icon is detected, the value of the gauge may be selectively increased and decreased repeatedly to adjust the value of the gauge. The value of the gauge may be stopped at the point in time at which the touch release is detected. In this instance, the value of the gauge when stopped may be computed or determined as the self-timer value, for example.

The timer value computing unit 110 may compute or determine the self-timer value based on a touch input provided in a clockwise direction or counterclockwise direction on a timer icon to be generated in the activated touch interface when the touch input provided on the photographing icon is maintained for longer than a reference time.

For example, where the reference time is set to one second, the timer icon may be generated when the touch input provided on the photographing icon continues for longer than one second. When the touch input is provided on the timer icon in a clockwise direction, the value of the gauge may be increased. When the touch input is provided on the timer icon in a counterclockwise direction, the value of the gauge may be decreased. Conversely, when the touch input is provided in the counterclockwise direction, the value of the gauge may be increased. When the touch input is provided in the clockwise direction, the value of the gauge may be decreased. When the touch input provided on the timer icon is terminated, for example, when the touch release is detected, a value of the gauge determined at the point in time at which the touch release is detected may be computed or determined as the self-timer value, for example.

The timer value computing unit 110 may compute the self-timer value based on a difference between the time at which the touch input is provided or received, such as when the touch input to a photographing icon is detected, on the timer icon and the time at which the touch release is detected. Here, the timer icon may be generated in the activated touch interface when the received touch input is maintained on the photographing icon for longer than a reference time.

The timer value computing unit 110 may compute, as the self-timer value, a value of the gauge determined at a point in time at which the touch release is detected on the timer icon, such as when a value of the gauge is selectively increased and decreased repeatedly to adjust the value of the gauge, by the touch input provided on the timer icon, the timer icon to be generated in the activated touch interface when the touch input is maintained on the photographing icon for longer than a reference time. When the touch input is provided on the timer icon, an increase or decrease of the value of the gauge may be initiated. When the touch release is detected on the timer icon, a movement of the gauge may be stopped. A value of the gauge stopped at the time at which the touch release is detected may be computed or determined as the self-timer value, for example.

The control unit 120 may cancel a computing operation of a self-timer of the terminal 1 when a touch release fails to be detected until the value of the gauge reaches a maximum value, for example. In addition, the control unit 120 may cancel the computing operation of the self-timer of the terminal 1 when a touch drag is provided or received in a reference area in the activated touch interface.

The control unit 120 may perform an overall control of the photographing timer control apparatus 100 of FIG. 1, and may also perform functions of the timer value computing unit 110, the display unit 130, the gauge setting unit 140, the gauge speed control unit 150, and the memory/storage unit 160. In the exemplary embodiments of FIG. 1, the configurations of the described units have been illustrated separately in order to describe each function or operation individually. Accordingly, in the photographing timer control apparatus 100 of terminal 1 all of the configurations or operations of the described units may be designed to be processed by the control unit 120, and, alternatively, only a portion of the configurations or operations of the described units may be designed to be processed by the control unit 120.

FIG. 2 is a block diagram illustrating a photographing timer control apparatus 200 of the terminal 2 according to exemplary embodiments of the present invention.

Referring to FIG. 2, the photographing timer control apparatus 200 of the terminal 2 may include a coordinate obtaining unit 210, a distance computing unit 220, a timer value computing unit 230, a control unit 240, and a display unit 250. The photographing timer control apparatus may further include a gauge setting unit 260, and a gauge speed control unit 270, a memory/storage unit 280 to store data, applications or programs for operations of the terminal 2 and for operations of the photographing timer control apparatus 200, according to exemplary embodiments. Also, a camera 290 of the terminal 2 for performing photographing operations is associated with the photographing timer control apparatus 200.

The photographing timer control apparatus 200 of the terminal 2 of FIG. 2, according to exemplary embodiments, is similar to the photographing timer control apparatus 100 of the terminal 1 of FIG. 1. Therefore, unless described otherwise, corresponding components, elements, units, devices and modules of the photographing timer control apparatus 200 of the terminal 2, such as the timer value computing unit 230, the control unit 240, the display unit 250, the gauge setting unit 260, the gauge speed control unit 270 and the memory storage unit 280 as may operate in a similar manner as described with respect to those corresponding components, elements, units, devices and modules of photographing timer control apparatus 100 of the terminal 1, and descriptions of the same or similar components, elements, units, devices and modules as those of photographing timer control apparatus 100 of the terminal 1 of FIG. 1 may be simplified or omitted.

Continuing with reference to FIG. 2, the coordinate obtaining unit 210 may obtain coordinates of a location at a position at which a touch input is provided or received, such as when the touch input to the photographing icon is detected, such as on a photographing icon displayed on a screen on the display unit 250, and coordinates of a location at a position at which a touch release is detected on the screen, in a touch interface associated with the screen of the display unit 250. The touch interface may be configured by a touch IC, for example. In this regard, the coordinate obtaining unit 210 may obtain the coordinates of the position at which the touch input is provided or received, such as when the touch input on the photographing icon is detected, and the coordinates of the position at which the touch release is detected, from the touch IC.

Also, the coordinate obtaining unit 210 may obtain or determine coordinates of a location at a position at which the touch input is provided or received, such as when the touch input to the photographing icon is detected, and coordinates of a location at a position at which a touch drag is terminated. The position at which the touch drag is terminated may be identified as a position at which the touch input continues for a reference time in a fixed or reference area of the activated touch interface associated with screen of the display unit 250 after the touch drag continues, for example.

The distance computing unit 220 may compute or determine a distance between the coordinates of the location at the position at which the touch input is provided or received, such as when the touch input on the photographing icon is detected and the coordinates of the location at the position at which the touch release is detected. The distance computing unit 220 may compute or determine a distance by which the touch drag is performed.

The timer value computing unit 230 may compute or determine a self-timer value, such as based on or in proportion to or in relation to the distance computed or determined by the distance computing unit 220. For example, as the computed or determined distance selectively increases, the self-timer value may be increased. Conversely, as the computed or determined distance selectively decreases, the self-timer value may be decreased.

The control unit 240, such as configured as a processor, may control a photographing operation of the terminal 2, such as a photographing timer operation of the camera 290 of the terminal 2, based on the self-timer value computed or determined by the timer value computing unit 230, as well as may control other operations of the terminal 2. For example, when the self-timer value computed or determined by the timer value computing unit 230 corresponds to five seconds, the control unit 240 may count, such as by a timer included in or associated with the control unit 240, five seconds, and may initiate the photographing operation of the camera 290 of the terminal 2 after five seconds.

The display unit 250 may display a process of performing the counting in the activated touch interface on a screen of the display unit 250 of the terminal 2. For example, the display unit 250 may display a value of a gauge decreasing. As another example, the display unit 250 may display a number being counted in the activated touch interface. For example, when the computed self-timer value corresponds to five seconds, the display unit 250 may display a number being counted, for example, 5, 4, 3, 2, 1, and the like, in the activated touch interface on the screen of the display unit 250, according to exemplary embodiments.

The display unit 250 may display, in the touch interface, at least one of a gauge indicating a self-timer value, and a number directly indicating the self-timer value, for example. The display unit 250 may display, in the touch interface, a time being counted down from the computed or determined self-timer value. The display unit 250 may display the self-timer value along with the gauge in the activated touch interface, or may display the self-timer value solely, without the gauge, in the activated touch interface, for example.

When a touch release is detected in the activated touch interface, the display unit 250 may display a value decreasing from a value of the gauge determined at a point in time at which the touch release is detected. In this regard, the control unit 240 may initiate the photographing operation of the terminal 2 when the value of the gauge decreases to "0." As an example, the control unit 240 may activate the camera operation of the terminal 2, based on the self-timer value.

When a touch release is detected in the activated touch interface, the display unit 250 may display a number decreasing from a self-timer value determined at a point in time at which the touch release is detected. In this regard, for example, the control unit 240 may initiate the photographing operation of the terminal 2 when the number being displayed decreases to "0."

The gauge setting unit 260 may set a difference between a time at which the touch input is received or provided, such as when a touch input on the photographing icon is detected, and a time at which the touch release is detected to be an initial value of the gauge. In addition, the gauge setting unit 260 may set a time during which a touch drag is maintained to be the initial value of the gauge. The initial value may refer to a value from which the value of the gauge is selectively increased or decreased, such as to adjust the value of the gauge.

The gauge speed control unit 270 may control a speed at which the value of the gauge is selectively increased and decreased from the initial value, based on the distance computed or determined by the distance computing unit 220. For example, when the distance computed or determined by the distance computing unit 220 increases, the speed at which the value of the gauge is increased and decreased may increase. When the distance computed or determined by the distance computing unit 220 decreases, the speed at which the value of the gauge is increased and decreased may decrease.

The timer value computing unit 230 may compute or determine, as the self-timer value, a timer value mapped to an area in which the touch release is detected in the activated touch interface on the screen of the display unit 250. A timer value may be mapped in advance, for each area of the touch interface. The timer value mapped to the area in which the touch release is detected may be computed or determined as the self-timer value, for example, according to exemplary embodiments.

The timer value computing unit 230 may compute or determine, as the self-timer value, a value of the gauge determined at a point in time at which the touch release is detected, when the value of the gauge indicating the self-timer value is selectively increased and decreased repeatedly after the touch input is provided or received, such as when a touch input on the photographing icon is detected, such as to adjust a value of the gauge, for example.

When the touch input is provided, the value of the gauge may be selectively increased and decreased repeatedly, such as to adjust the value of the gauge. The value of the gauge may be stopped at the point in time at which the touch release is detected. In this instance, the value of the gauge when stopped may be computed or determined as the self-timer value.

The timer value computing unit 230 may compute or determine the self-timer value based on a touch input received or provided in a clockwise direction or counterclockwise direction on a timer icon to be generated in the activated touch interface of the screen of the display unit 250 when the touch input received or provided on the photographing icon is maintained for longer than a reference time.

For example, where the reference time is set to one second, the timer icon may be generated when the touch input received or provided on the photographing icon continues for longer than one second. When the touch input is received or provided on the timer icon in a clockwise direction, the value of the gauge may be increased. And when the touch input is received or provided on the timer icon in a counterclockwise direction, the value of the gauge may be decreased. For example, when the touch input is provided in the counterclockwise direction, the value of the gauge may be increased, and when the touch input is provided in the clockwise direction, the value of the gauge may be decreased. When the touch input received or provided on the timer icon is terminated, that is, when the touch release is detected, a value of the gauge determined at the point in time at which the touch release is detected may be computed or determined as the self-timer value, for example.

The control unit 240 may perform an overall control of the photographing timer control apparatus of FIG. 2, and may also perform functions or operations of the coordinate obtaining unit 210, the distance computing unit 220, the timer value computing unit 230, the display unit 250, the gauge setting unit 260, the gauge speed control unit 270 and the memory/storage unit 280. The configurations of the described units have been illustrated separately in order to describe each function or operation individually. However, all of the configurations or operations of the described units may be designed to be processed by the control unit 240, and only a portion of the configurations or operations of the described units may be designed to be processed by the control unit 240, for example.

FIG. 3 is a block diagram illustrating a photographing timer control apparatus 300 of the terminal 3 according to exemplary embodiments of the present invention.

Referring to FIG. 3, the photographing timer control apparatus 300 may include an input time obtaining unit 310, an input time computing unit 320, a timer value computing unit 330, a control unit 340, and a display unit 350. The photographing timer control apparatus 300 may further include a gauge setting unit 360, and a gauge speed control unit 370, a memory/storage unit 380 to store data, applications or programs for operations of the terminal 3 and for operations of the photographing timer control apparatus 300, according to exemplary embodiments. Also, a camera 390 of the terminal 3 for performing photographing operations is associated with the photographing timer control apparatus 300.

The photographing timer control apparatus 300 of the terminal 3 of FIG. 3, according to exemplary embodiments, is similar to the photographing timer control apparatuses 100 and 200 of the terminals 1 and 2 of FIG. 1 and FIG. 2. Therefore, unless described otherwise, corresponding components, elements, units, devices and modules of the photographing timer control apparatus 300 of the terminal 3, such as the timer value computing unit 330, the control unit 340, the display unit 350, the gauge setting unit 360, the gauge speed control unit 370 and the memory/storage unit 380 as may operate in a similar manner as described with respect to those corresponding components, elements, units, devices and modules of photographing timer control apparatuses 100 and 200 of the terminal 1 of FIG. 1 and FIG. 2, and descriptions of the same or similar components, elements, units, devices and modules as those of photographing timer control apparatuses 200 and 300 of the terminals 1 and 2 may be simplified or omitted.

Continuing with reference to FIG. 3, the input time obtaining unit 310 may obtain a time at which a touch input is received by or provided on a photographing icon in an activated touch interface on a screen of the display unit 350, and a time at which maintenance of the received touch input is terminated.

The input time computing unit 320 may compute or determine a touch duration or a time during which the touch input is maintained from the time at which the touch input is received or provided, such as when a touch input on the photographing icon is detected, such as on a photographing icon in the activated touch interface, to a time at which the touch input is terminated, such as may occur at a time a touch release of the touch input on the photographing icon is detected, for example.

The timer value computing unit 330 may compute or determine a self-timer value, based on or in proportion to or in relation to the touch duration computed or determined by the input time computing unit 320. For example, as the computed or determined touch duration, such as a time period when the touch input is maintained on the photographing icon, increases, the self-timer value may be selectively increased. Conversely, as the computed or determined touch duration decreases, the self-timer value may be selectively decreased.

The control unit 340, such as configured as a processor, may control a photographing operation of the terminal 3, such as photographing operation of the camera 390 of the terminal 3, based on the self-timer value computed or determined by the timer value computing unit 330, as well as may control other operations of the terminal 3. For example, when the self-timer value computed or determined by the timer value computing unit 330 corresponds to four seconds, the control unit 340 may count, such as by a timer included in or associated with the control unit 340, four seconds, and may initiate the photographing operation of the camera 390 of the terminal 3 after four seconds.

The display unit 350 may display a process for performing the counting in the activated touch interface on a screen of the display unit 350 of the terminal 3. For example, the display unit 350 may display a value of a gauge decreasing in value. As another example, the display unit 350 may display a number being counted in the activated touch interface. For example, when the computed self-timer value corresponds to 4 seconds, the display unit 350 may display a number being counted, for example, 4, 3, 2, 1, and the like, in the activated touch interface on the screen of the display unit 350.

The display unit 350 may display, in the touch interface, at least one of a gauge indicating a self-timer value, and may display a number directly indicating the self-timer value. The display unit 350 may display the self-timer value along with the gauge in the activated touch interface, or may display the self-timer value solely, without the gauge, in the activated touch interface, for example, according to exemplary embodiments.

When a touch release is detected in the activated touch interface, the display unit 350 may display a value of the gauge decreasing from a value of the gauge determined at a point in time at which the touch release is detected. In this regard, the control unit 340 may initiate the photographing operation of the terminal 3 when the value of the gauge decreases to "0." That is, the control unit 340 may activate the camera operation of the terminal 3, based on the self-timer value, for example.

Also, for example, when a touch release is detected in the activated touch interface of the screen of the display unit 350, the display unit 350 may display a number decreasing from a self-timer value determined at a point in time at which the touch release is detected. And, in this regard, for example, the control unit 340 may initiate the photographing operation of the terminal 3 when the number being displayed decreases to "0."

The gauge setting unit 360 may set a difference between a time at which the touch input is received or provided, such as when a touch input on the photographing icon is detected, and a time at which the touch release is detected to be an initial value of the gauge. In addition, the gauge setting unit 360 may set a time during which a touch drag is maintained to be the initial value of the gauge. The initial value may refer to a value from which the value of the gauge is selectively increased or decreased, such as to adjust a value of the gauge.

The gauge speed control unit 370 may control a speed at which the value of the gauge is selectively increased and decreased from the initial value, based on the touch duration computed or determined by the input time computing unit 320. For example, when the touch duration computed by the input time computing unit 320 increases, the speed at which the value of the gauge is selectively increased and decreased may increase. And, when the touch duration computed by the input time computing unit 320 decreases, the speed at which the value of the gauge is selectively increased and decreased may decrease.

The control unit 340 may perform an overall control of the photographing timer control apparatus 300 of FIG. 3, and may also perform functions or operations of the input time obtaining unit 310, the input time computing unit 320, the timer value computing unit 330, the display unit 350, the gauge setting unit 360, the gauge speed control unit 370 and the memory/storage unit 380. The configurations of the described units have been illustrated separately in order to describe each function or operation individually. However, all of the configurations or operations of the described units may be designed to be processed by the control unit 340, and only a portion of the configurations or operations of the described units may be designed to be processed by the control unit 340, for example.

FIG. 4 is a block diagram illustrating a photographing timer control apparatus 400 of the terminal 4 according to exemplary embodiments of the present invention.

Referring to FIG. 4, the photographing timer control apparatus 400 may include a coordinate obtaining unit 410, a distance computing unit 420, an input time obtaining unit 430, an input time computing unit 440, a timer value computing unit 450, a control unit 460, and a display unit 470. The photographing timer control apparatus 400 may further include a gauge setting unit 480, and a gauge speed control unit 490, a memory/storage unit 465 to store data, applications or programs for operations of the terminal 1 and for operations of the photographing timer control apparatus 400, according to exemplary embodiments. Also, a camera 475 of the terminal 1 for performing photographing operations is associated with the photographing timer control apparatus 400.

The photographing timer control apparatus 400 of the terminal 4 of FIG. 4, according to exemplary embodiments, is similar to the photographing timer control apparatuses 100, 200 and 300 of the terminals 1, 2 and 3 of FIG. 1 to FIG. 3. Therefore, unless described otherwise, corresponding components, elements, units, devices and modules of the photographing timer control apparatus 400 of the terminal 4, such as the coordinate obtaining unit 410, the distance computing unit 420, the input time obtaining unit 430, the input time computing unit 440, the timer value computing unit 450, the control unit 460, the display unit 470, the gauge setting unit 480, the gauge speed control unit 490, and the memory/storage unit 465 as may operate in a similar manner as described with respect to those corresponding components, elements, units, devices and modules of photographing timer control apparatuses 100, 200 and 300 of the terminals 1, 2 and 3, and descriptions of the same or similar components, elements, units, devices and modules as those of photographing timer control apparatuses 100, 200 and 300 of the terminals 1, 2 and 3 of FIG. 1 to FIG. 3 may be simplified or omitted.

Continuing with reference to FIG. 4, the coordinate obtaining unit 410 may obtain coordinates of a location at a position at which a touch input is provided or received, such as when a touch input on the photographing icon is detected, and coordinates of a location at a position at which a touch drag is provided, in an activated touch interface, such as on a screen of the display unit 470.

The distance computing unit 420 may compute a distance between the coordinates of the location at the position at which the touch input is provided or received, such as when a touch input on the photographing icon is detected, and the coordinates of the locations at the positions at which the touch drag is provided or received in the activated touch interface, such as on the screen of the display unit 470.

The input time obtaining unit 430 may obtain or determine a time at which the touch input is received or provided, such as when a touch input on the photographing icon is detected, and a time at which the touch drag is received or provided, such as when the touch drag is detected, in the activated touch interface, to a time at which the touch drag is terminated, for example.

Also, the input time computing unit 440 may compute or determine a difference between the time at which the touch input is detected on the photographing icon and the time during which the touch drag is maintained or the time at which the touch drag is terminated, such as my occur at a time at which the touch release of the touch input on the photographic icon is detected, for example.

The timer value computing unit 450 may compute or determine a value of a gauge as a self-timer value. When the touch input is provided, the value of the gauge may be selectively increased and decreased repeatedly, such as to adjust the value of the gauge, for example. When the touch drag is terminated, the selective increase and the decrease of the value of the gauge may be terminated. The timer value computing unit 450 may compute or determine, as the self-timer value, a value of the gauge when stopped at a point in time at which the touch drag is terminated.

The control unit 460, such as configured as a processor, may control a photographing operation of the terminal 4, such as a photographing timer operation of the camera 475 of the terminal 4, based on the self-timer value computed by the timer value computing unit 450, as well as may control other operations of the terminal 4. For example, when the self-timer value computed by the timer value computing unit 450 corresponds to ten seconds, the control unit 460 may count, such as by a timer included in or associated with the control unit 460, ten seconds, and may initiate the photographing operation of the camera 475 of the terminal 4 after ten seconds, for example.

The display unit 470 may display a process of performing the counting in the activated touch interface on a screen of the display unit 470 of the terminal 4. For example, the display unit 470 may display a value of a gauge decreasing in value corresponding to a photographing timer operation. For example, the display unit 470 may display a number being counted in the activated touch interface. In this regard, for example, when the computed or determined self-timer value corresponds to ten seconds, the display unit 470 may display a number being counted, for example, 10, 5, 2, 1, and the like, in the activated touch interface, on the screen of the display unit 470, according to exemplary embodiments.

The display unit 470 may display, in the activated touch interface, a photographing icon, such as a shutter button, on which at least one of a touch down event and a touch up event is provided, and may also display a gauge indicating a self-timer value based on the touch up event or the touch down event, for example. The display unit 470 may display the self-timer value along with the gauge in the activated touch interface, or may display the self-timer value solely, without the gauge, in the activated touch interface, on the screen of the display unit 470, according to exemplary embodiments.

When a touch release is detected in the activated touch interface, the display unit 470 may display a value decreasing from a value of the gauge determined at a point in time at which the touch release is detected. In this regard, the control unit 460 may initiate the photographing operation of the terminal 4 when the value of the gauge decreases to "0." That is, the control unit 460 may activate the camera operation of the terminal 4, based on the self-timer value.

Also, when a touch release is detected in the activated interface, the display unit 470 may display a number decreasing from a self-timer value determined at a point in time at the touch release is detected. In this regard, the control unit 460 may initiate the photographing operation of the terminal 4 when the number being displayed decreases to "0."

The gauge setting unit 480 may set a difference between the time at which the touch input is received or provided, such as when a touch input on the photographing icon is detected, and the time at which the touch drag is received or provided to be an initial value of the gauge.

Also, the gauge speed control unit 490 may control a speed at which the value of the gauge is selectively increased and decreased from the initial value, based on the distance computed or determined by the distance computing unit 420.

The control unit 460 may perform an overall control of the photographing timer control apparatus 400 of the terminal 4 of FIG. 4, and may also perform functions or operations of the coordinate obtaining unit 410, the distance computing unit 420, the input time obtaining unit 430, the input time computing unit 440, the timer value computing unit 450, the display unit 470, the gauge setting unit 480, the gauge speed control unit 490, and the memory/storage unit 465. The configurations of the described units have been illustrated separately in order to describe each function or operation individually. However, all of the configurations or operations of the described units may be designed to be processed by the control unit 460, and only a portion of the configurations or operations of the described units may be designed to be processed by the control unit 460, for example.

Figure 5:
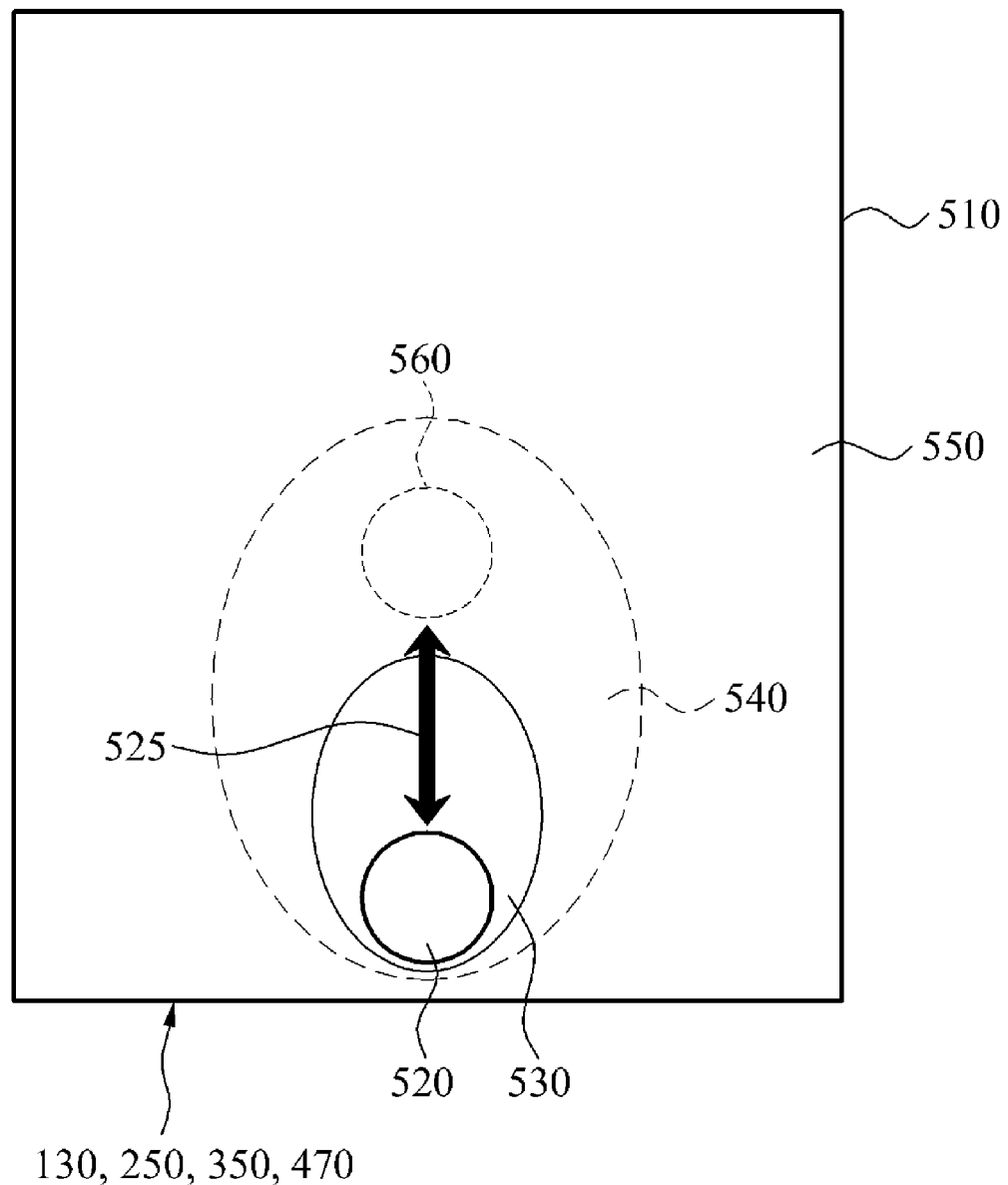
FIG. 5 is a diagram illustrating an interface in which a photographing timer is controlled based on an area in which a touch input is provided according to exemplary embodiments of the present invention.

FIG. 5 is a diagram illustrating an interface on a screen of the display unit, such as display units 130, 250, 350 and 470, of the terminals 1, 2, 3 and 4 in which a photographing timer is controlled based on an area in which a touch input is provided according to exemplary embodiments of the present invention.

Referring to FIG. 5, a photographing icon 520 may be disposed in a center at a right side of a screen 510 of the terminals 1, 2, 3 and 4 when the screen 510 is in a landscape mode. The photographing icon 520 may be disposed in a center at a lower portion of the screen 510 when the screen 510 is in a portrait mode. FIG. 5 illustrates the screen 510 of the terminals 1, 2, 3 and 4 in the portrait mode, for example.

A touch input may be provided on the photographing icon 520, the photographing icon 520 may be dragged, such as in an upward or a downward direction indicated by double-headed arrow 525, and a touch release may be provided in a location at a position corresponding to an area 560, for example. A value of a photographing timer, more particularly, a value of a self-timer, may be determined based on the location at the position of the area 560 in which the touch release is detected.

As shown in FIG. 5, the screen 510 may be divided into an area 530, an area 540, and an area 550. If times of three seconds, five seconds, and seven seconds are set for each of the areas 530, 540, and 550, respectively, the location at the position of the area 560 in which the touch release is detected belongs to the area 540, and a period of five seconds is determined to be the value of the photographing timer. If the location at the position of the area 560 in which the touch release is detected is in the area 530 or the area 550, the value of the photographing timer is determined to be periods of three second or seven seconds, respectively.

In this regard, according to exemplary embodiments, a corresponding time may be mapped to each of the areas 530, 540, and 550, in advance, and the value of the photographing timer may be determined to be a time mapped to the area 560 in which the touch release is detected, according to exemplary embodiments.

Figure 6:
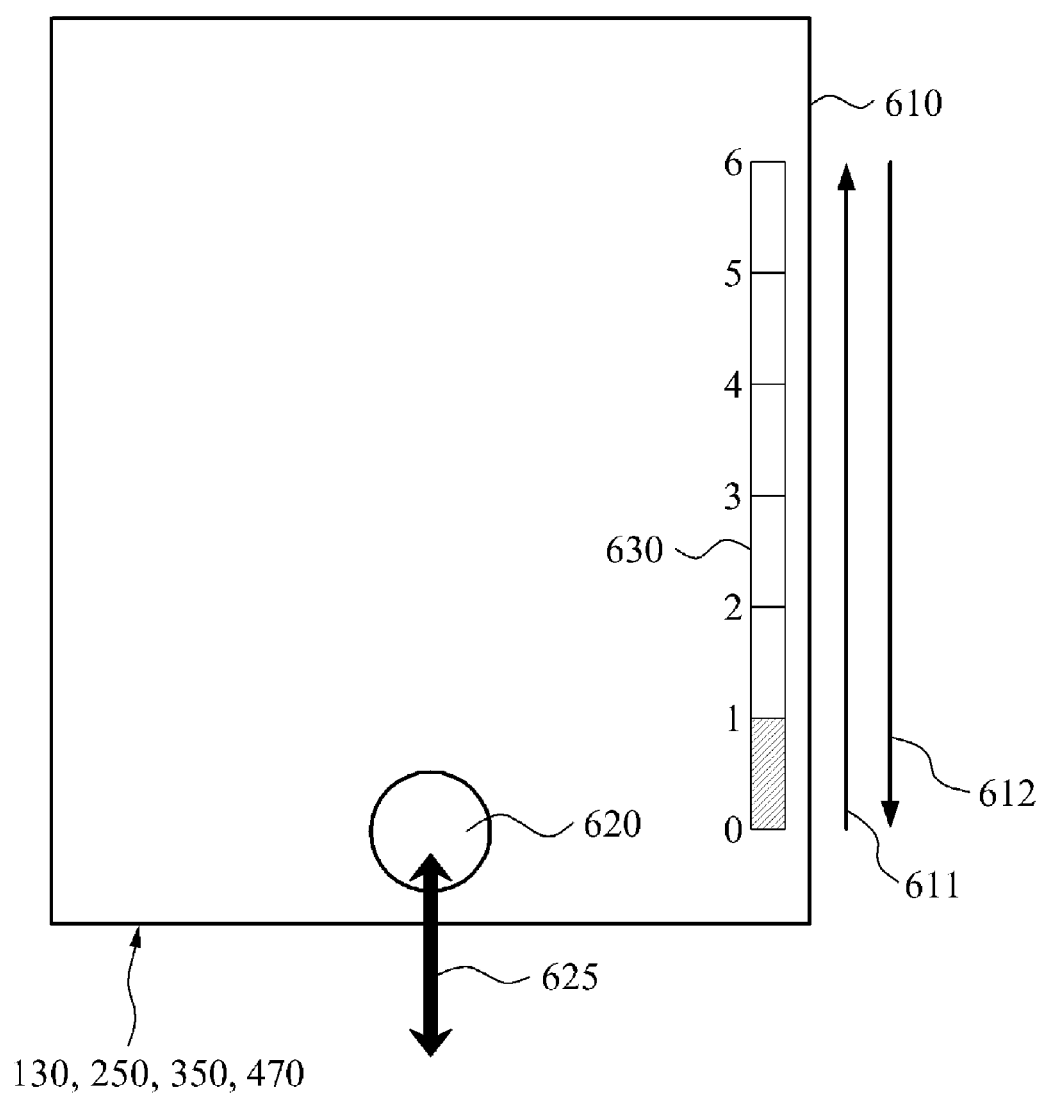
FIG. 6 is a diagram illustrating an interface in which a photographing timer is controlled based on a time during which a touch input is maintained according to exemplary embodiments of the present invention.

FIG. 6 is a diagram illustrating an interface on a screen of the display unit, such as the display units 130, 250, 350 and 470, of the terminals 1, 2, 3 and 4 in which a photographing timer is controlled based on a time during which a touch input is maintained according to exemplary embodiments of the present invention.

Referring to FIG. 6, a photographing icon 620 may be disposed at a location at a position in a center at a right side of a screen 610 of the terminals 1, 2, 3 and 4 when the screen 610 is in a landscape mode. The photographing icon 620 may be disposed at a location at a position in a center at a lower portion of the screen 610 when the screen 610 is in a portrait mode. FIG. 6 illustrates the screen 610 of the terminals 1, 2, 3 and 4 in the portrait mode, for example.

When the photographing icon 620 is pushed or touched, such as in an upward or downward direction indicated by the double-headed arrow 625, such that a touch input is received or provided, a value of a gauge 630 may be displayed on the screen 610. In this instance, the gauge 630 may be displayed to have a value ranging from "0" to a maximum value, such as "6" illustrated in FIG. 6, for example. When the touch input on the photographing icon 620 continues, the value of the gauge 630 may be increased and decreased repeatedly to adjust a value of the gauge 630, such as illustrated by the upward and downward directional arrows 611 and 612, respectively, for example. When a touch release is detected on the photographing icon 620, a movement of the gauge 630 may be stopped, and a value of the photographing timer, more particularly, a value of a self-timer, may be determined to be a value of the stopped gauge 630, for example.

Although the gauge 630 is illustrated in FIG. 6, a value may be displayed on the screen 610 directly, in lieu of the gauge 630, such as indicated by the numerals "0" to "6". For example, when the touch input on the photographing icon 620 continues, a number increasing sequentially starting from "0" to "1, 2, 3, 4, 5 and 6" may be displayed, or indicated, on the screen 610 based on a reference criterion. When the number reaches a maximum value, the number may be displayed, or indicated, on the screen 610 in a decreasing succession. When the touch release is detected on the photographing icon 620, the selective increase and the decrease of the number, such as to adjust the value of the number, may be stopped, and the value of the photographing timer, more particularly, the value of the self-timer, may be determined to be the value at which the selective increase and decrease of the value of the self-timer are stopped.

Figure 7:
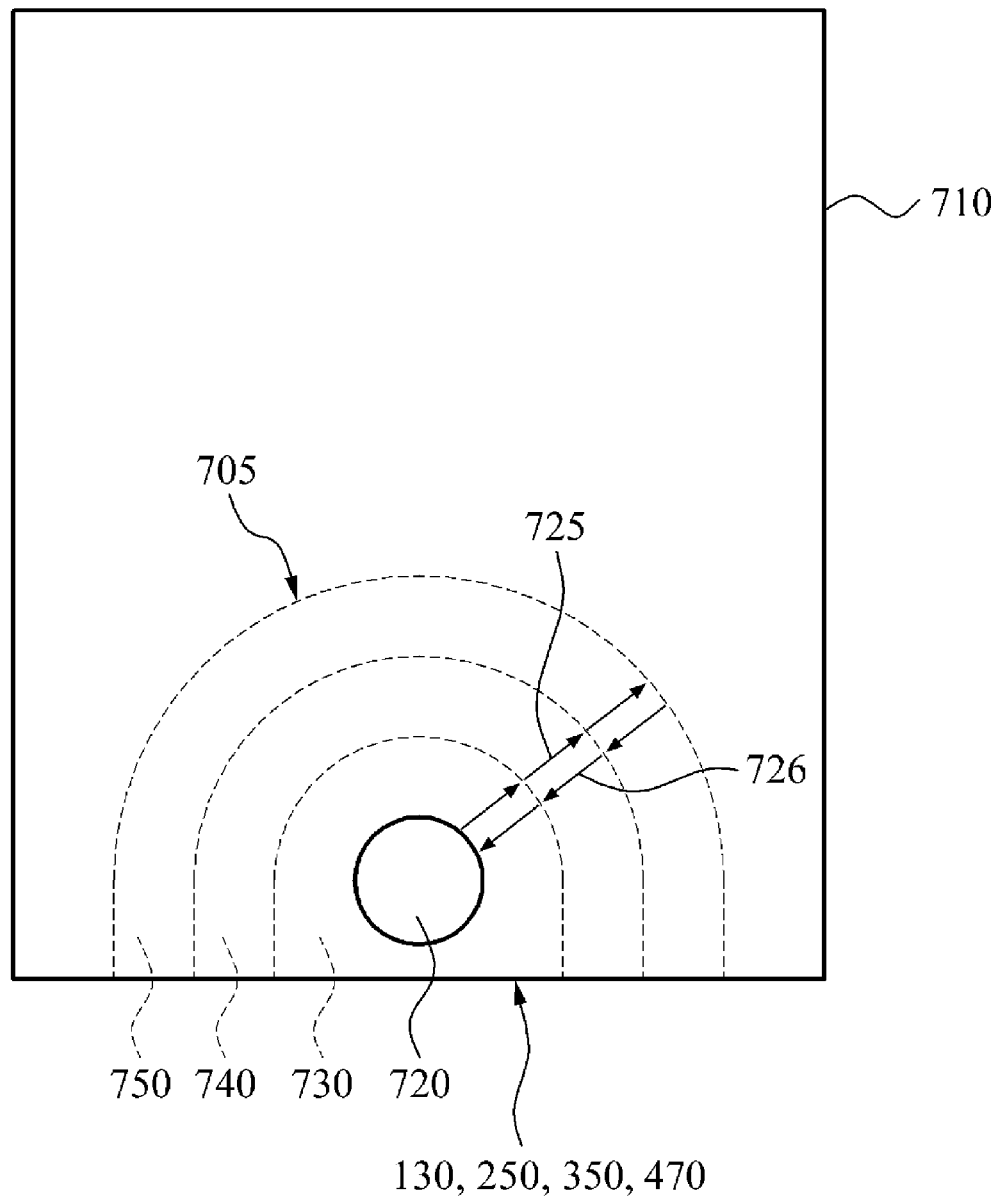
FIG. 7 is a diagram illustrating an interface in which a photographing timer is controlled based on a time during which a touch input is maintained according to exemplary embodiments of the present invention.

FIG. 7 is a diagram illustrating an interface on a screen of the display unit, such as the display units 130, 250, 350 and 470, of the terminals 1, 2, 3 and 4 in which a photographing timer is controlled based on a time during which a received touch input is maintained according to exemplary embodiments of the present invention.

FIG. 7 illustrates a gauge 705 on a screen 710 of the display unit. Referring to FIG. 7, a photographing icon 720 may be disposed at a location at a position in a center at a right side of a screen 710 of the terminals 1, 2, 3 and 4 when the screen 710 is in a landscape mode. The photographing icon 720 may be disposed at a location at a position in a center at a lower portion of the screen 710 when the screen 710 is in a portrait mode. FIG. 7 illustrates the screen 710 of the terminals 1, 2, 3 and 4 in the portrait mode, for example.

When the photographing icon 720 is pushed or touched, such as in the respective directions of the arrows 725 and 726, such that a touch input is received or provided, the gauge 705 may be displayed on the screen 710. In this instance, an increase and decrease of a value of the gauge 705 may be displayed in a form of a semicircle or similar shape based on the photographing icon 720. For example, the gauge 705 may be displayed in a form of at least partial semicircles or stacked or nested polygons extending to an edge of the screen 710. When the received touch input on the photographing icon 720 continues, the value of the gauge 705 may be increased and decreased to an area 730, an area 740, and an area 750, repeatedly. When a touch release is detected on the photographing icon 720, a movement of the gauge 705 may be stopped at a location at a position in the area 730, the area 740, or the area 750, and a value of a photographing timer, more particularly, a value of a self-timer, may be determined to be a value at which the gauge 705 is stopped in the area 730, the area 740, or the area 750, for example.

FIGS. 8A through 8D are diagrams illustrating interfaces on a screen of the display unit, such as the display units 130, 250, 350 and 470, of the terminals 1, 2, 3 and 4 in which a photographing timer is controlled based on a direction in which a touch input is provided according to an exemplary embodiment of the present invention.

Figure 8A:
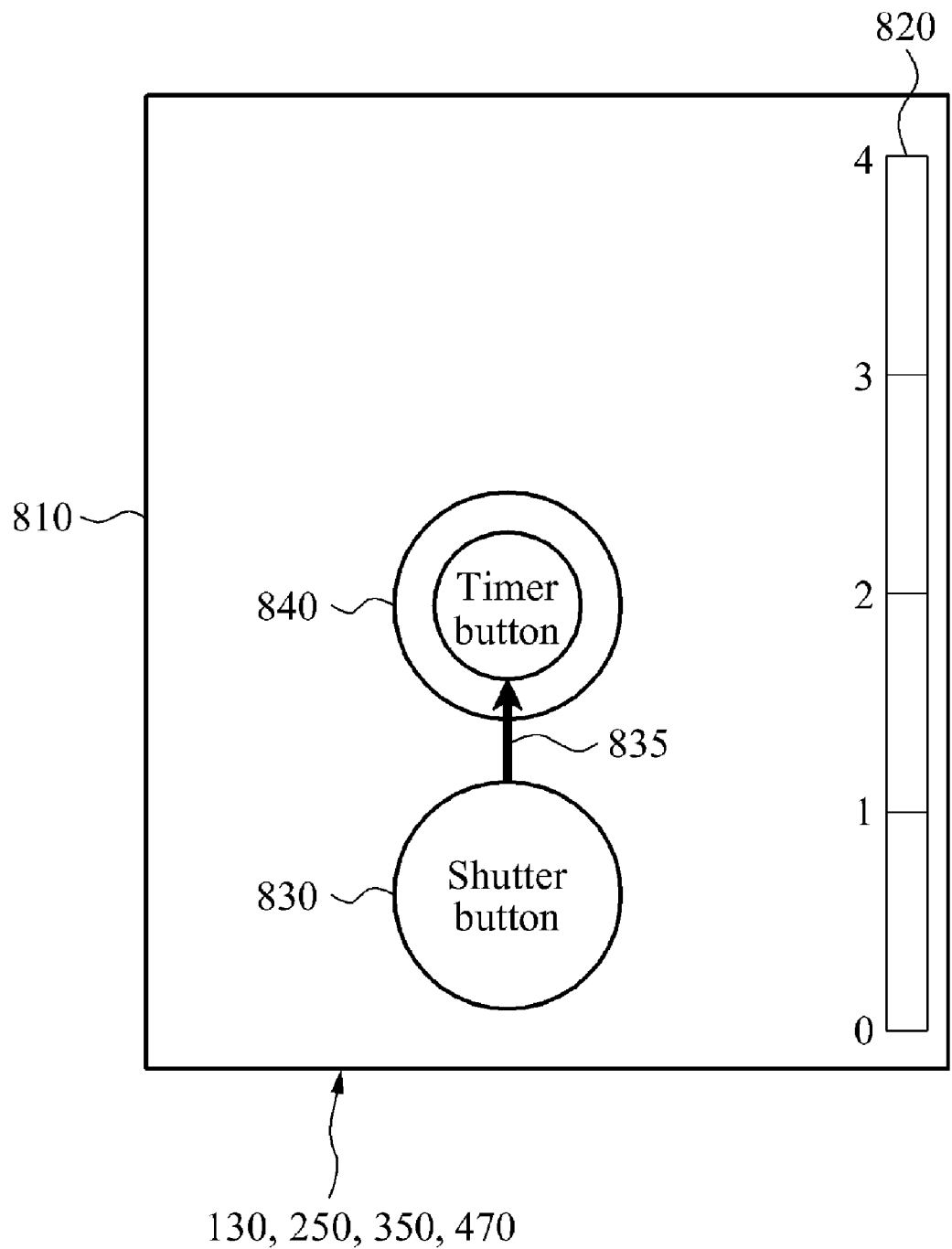
FIG. 8A through FIG. 8D are diagrams illustrating interfaces in which a photographing timer is controlled based on a direction in which a touch input is provided according to exemplary embodiments of the present invention.

Referring to FIG. 8A, when a shutter button 830 on a screen 810 is pushed or touched such that a touch input is received or provided, a gauge 820 may be displayed on the screen 810. In this instance, the gauge 820 may be displayed to have a value ranging from "0" to a maximum value, such as "4" illustrated in FIG. 8A, for example. The shutter button 830 may correspond to a photographing icon to activate a camera function or operation of the terminal 1, 2, 3 and 4, such as to control a photographing timer operation of the camera of the terminals 1, 2, 3 and 4, such as cameras 170, 290, 390 and 475, for example.

When the received touch input on the shutter button 830 continues, a timer icon 840, that is, a timer button, as a photographing icon, may be generated on the screen 810.

Figure 8B:
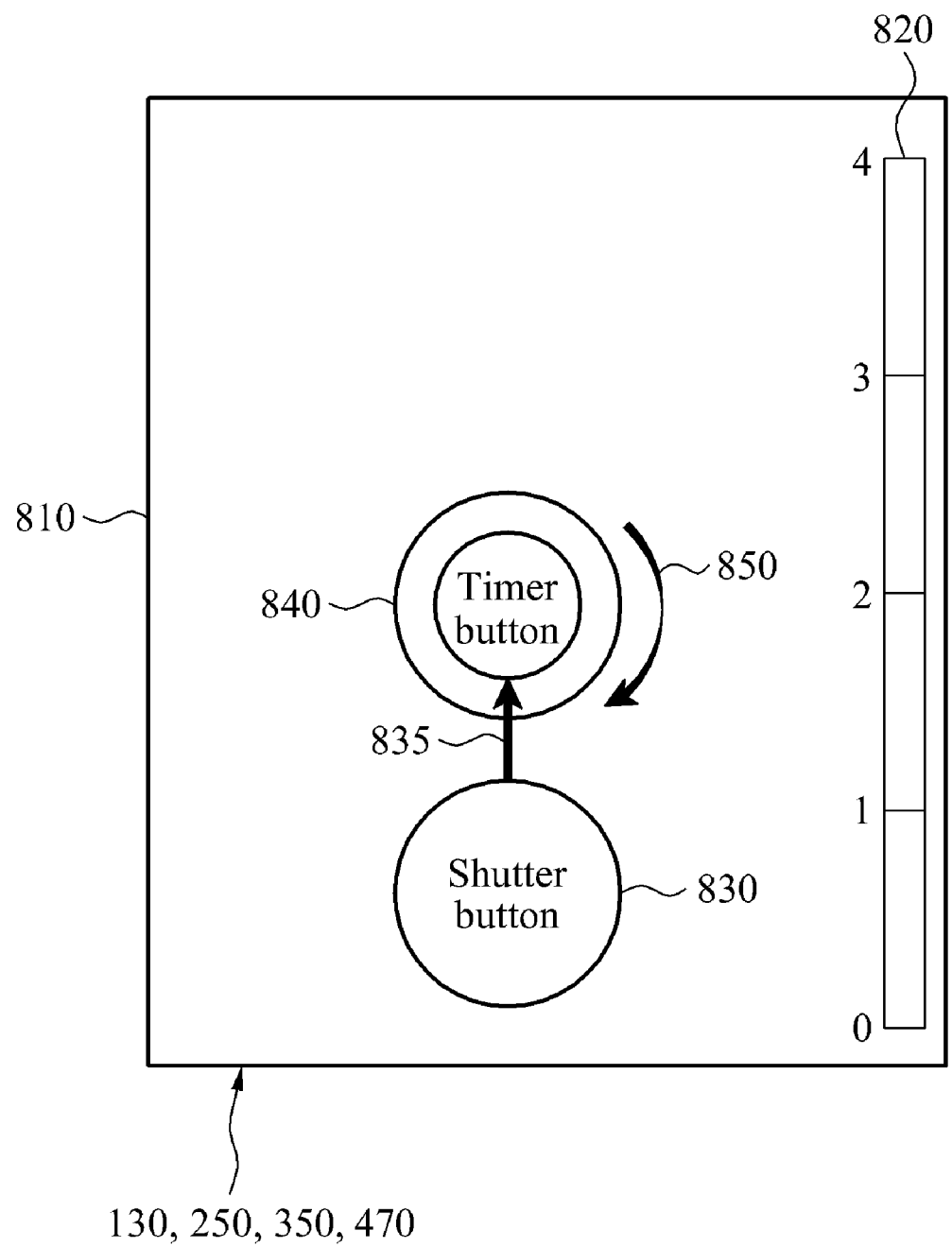
Figure 8C:
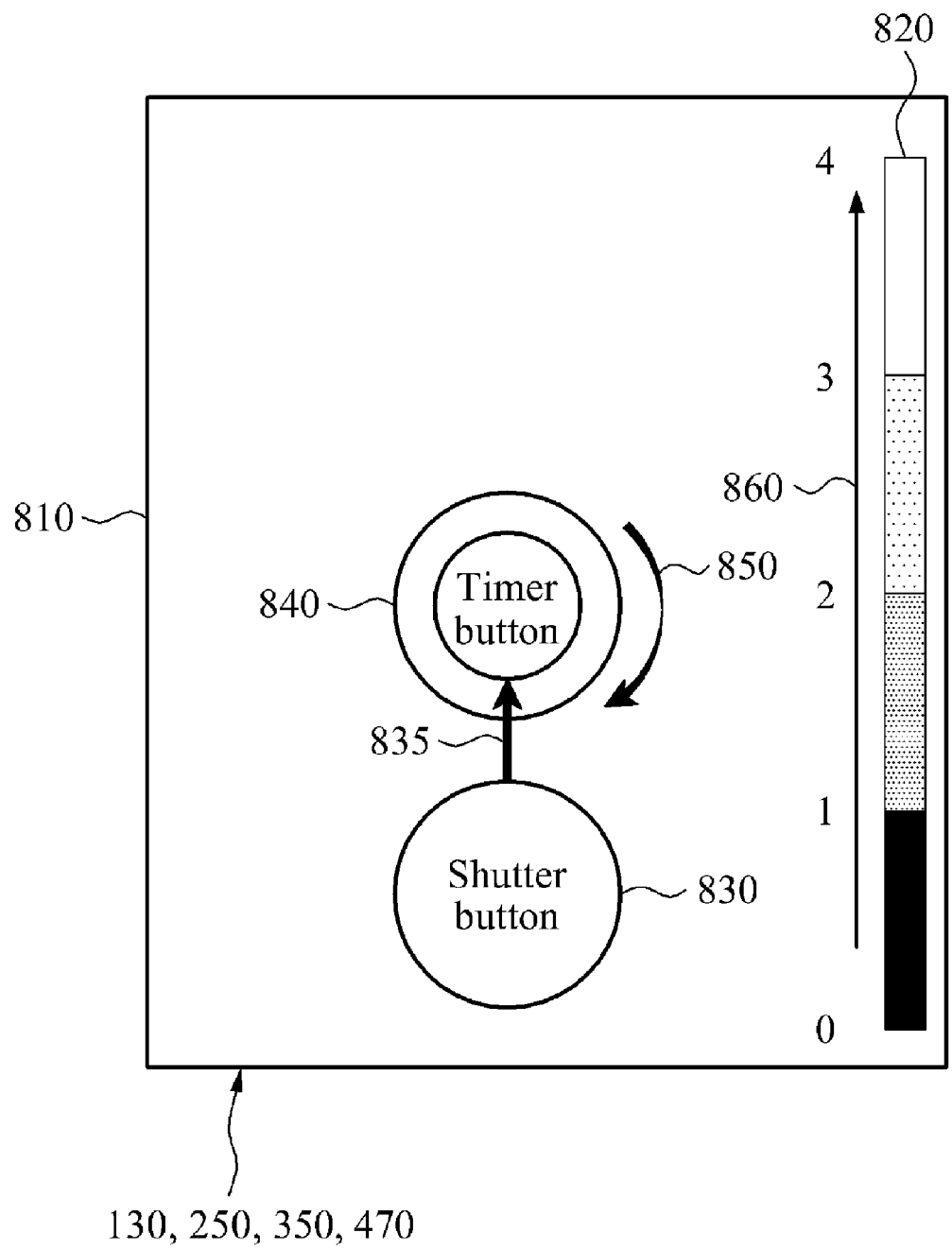

When a touch drag is provided in a direction from the shutter button 830 to the timer icon 840, such as from an initial location at a position of the shutter button 830 to a location at a position where the timer icon 840 is generated, as indicated by the arrow 835, and the timer icon 840 is wound, such as at a first location at a first position to a second location at a second position, the first location may be the same or approximately the same as the second location, in a clockwise direction 850 as shown in FIG. 8B, a value of the gauge 820 may be selectively increased as shown in a direction 860, such as illustrated by the "shaded" and "dotted" areas corresponding to an increased value from "0" to "3" of the gauge 820 of FIG. 8C, for example.

Figure 8D:
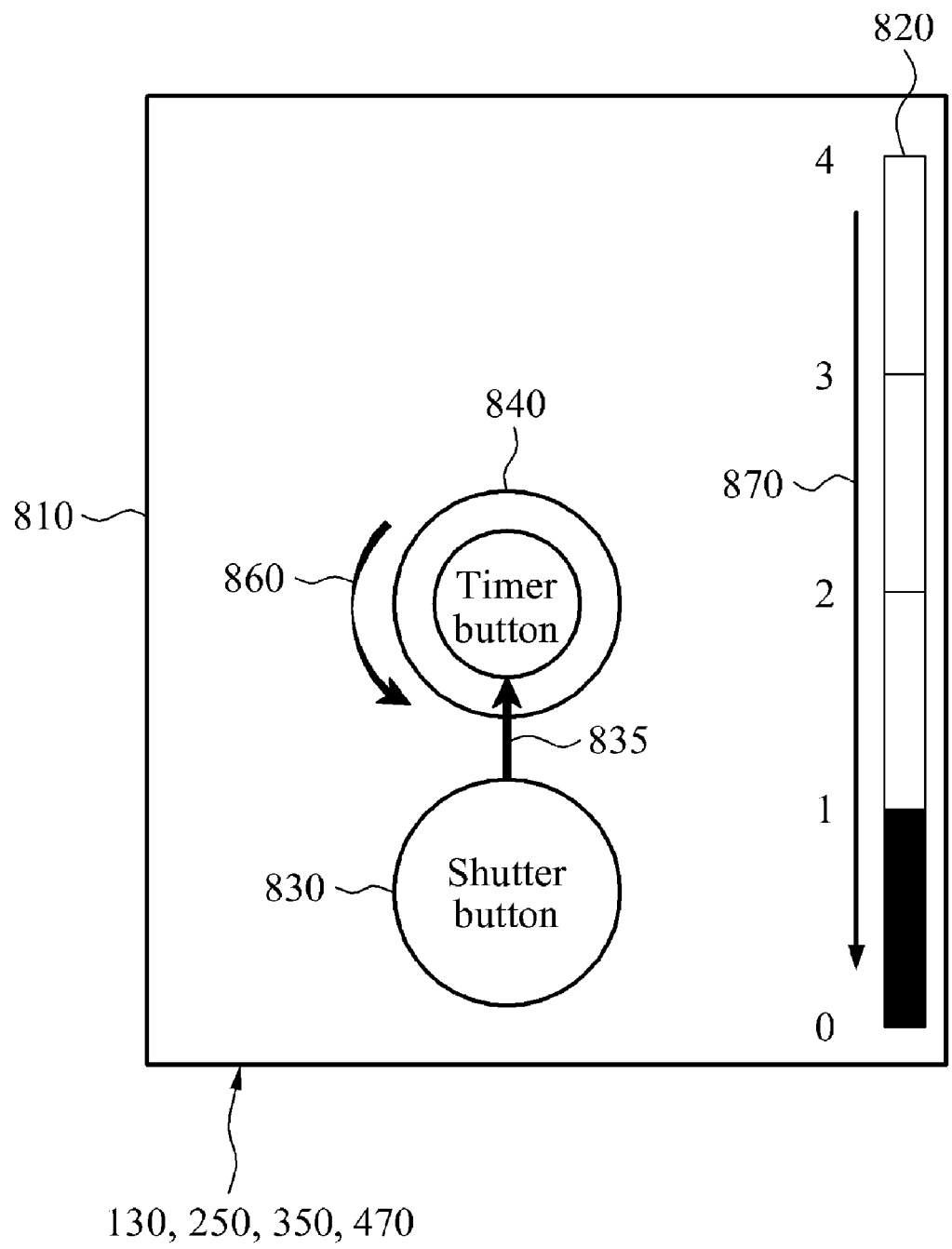

When a touch drag is provided in a direction from the shutter button 830 to the timer icon 840, as shown in FIG. 8B and the timer icon 840 is wound, such as at a first location at a first position to a second location at a second position, the first location may be the same or approximately the same as the second location, in a counterclockwise direction 860, as shown in FIG. 8D, the value of the gauge 820 may be selectively decreased as shown in a direction 870, such as illustrated by the "vacant" or "clear" areas and "shaded" corresponding to a decreased value from "3" of the gauge 820 of FIG. 8C to a value of "1" of the gauge 820 of FIG. 8D, for example.

When a touch release is detected on the timer icon 840, a movement of the gauge 820 may be stopped, and a value of a photographing timer, more particularly, a value of a self-timer, may be determined to be a value of the stopped gauge 820, for example according to exemplary embodiments.

Figure 9A:
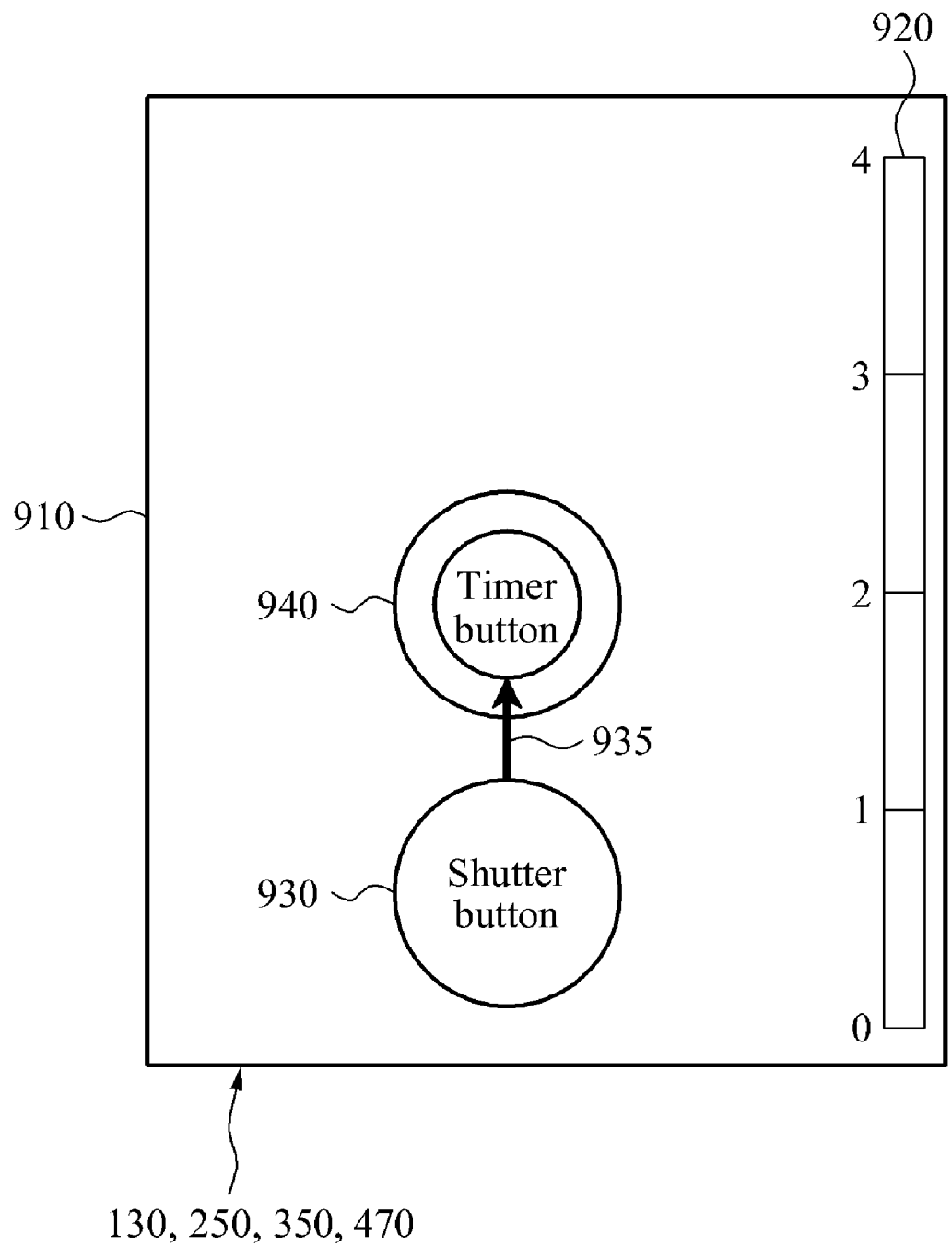
FIG. 9A and FIG. 9B are diagrams illustrating interfaces in which a photographing timer is controlled based on a time and an area in which a touch input is provided according to exemplary embodiments of the present invention.
Figure 9B:
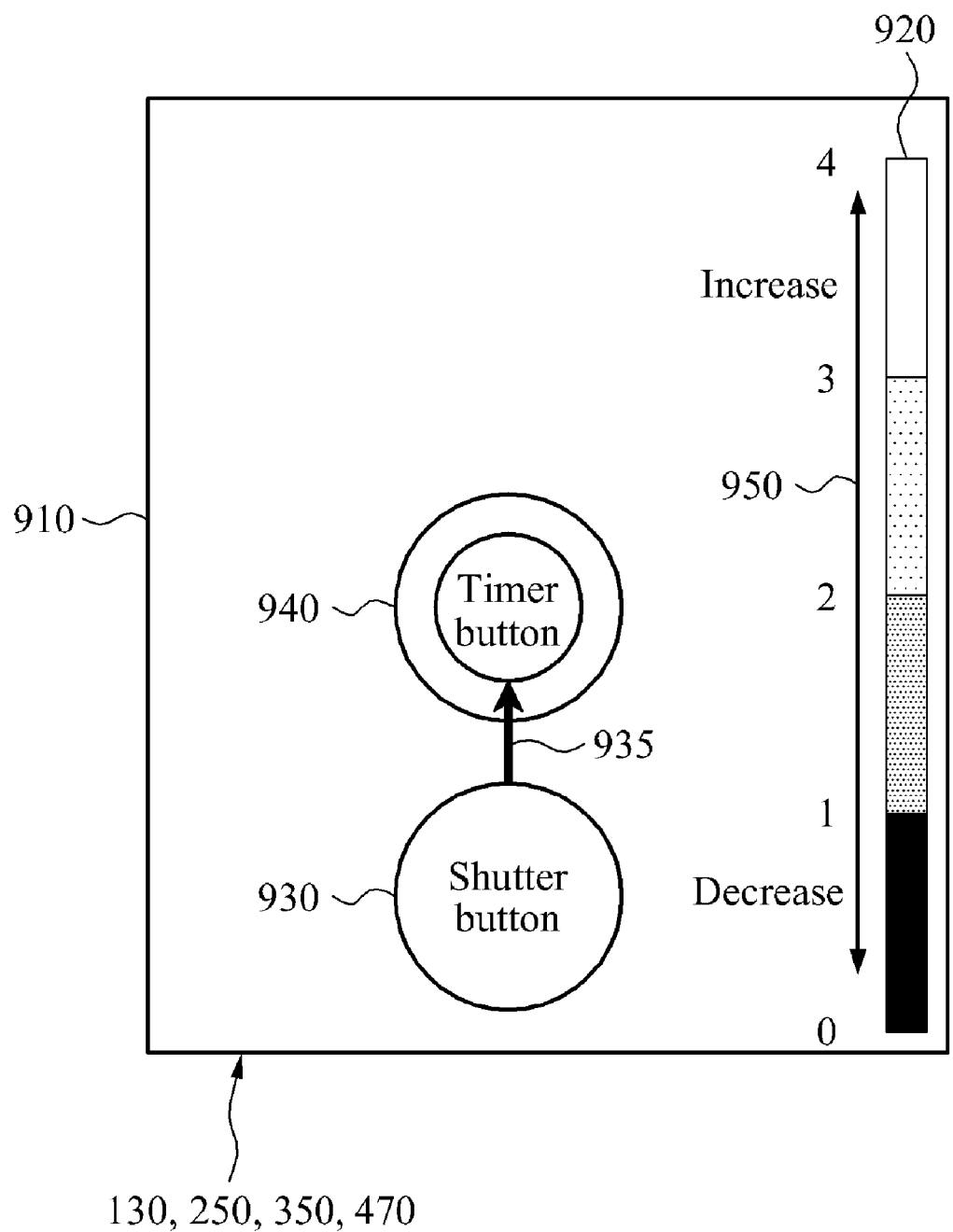

FIGS. 9A and 9B are diagram illustrating interfaces on a screen of the display unit, such as display units 130, 250, 350 and 470, of the terminals 1, 2, 3 and 4 in which a photographing timer is controlled based on a time duration of a touch input and a location at a position of an area in which a touch input is received or provided, such as when the touch input is detected, according to exemplary embodiments of the present invention.

Referring to FIG. 9A, when a shutter button 930 on a screen 910 is pushed or touched such that a touch input is received or provided, such as when the touch input is detected, a gauge 920 may be displayed on the screen 910. In this instance, the gauge 920 may be displayed to have a value ranging from "0" to a maximum value, such as "4" as illustrated in FIG. 9A, for example. The shutter button 930 may correspond to a photographing icon to activate or perform a camera function of the terminals 1, 2, 3 and 4, such as to control a photographing timer operation of the camera of the terminals 1, 2, 3 and 4, such as cameras 170, 290, 390 and 475, for example.

When the received touch input on the shutter button 930 continues, a timer icon 940, more particularly, a timer button, may be generated and displayed on the screen 910. A touch drag may be provided in a direction indicated by the arrow 935 from a location at a position of the shutter button 930 to a location at a position of the timer icon 940, as illustrated in FIG. 9A, for example.

When the received touch input on the timer icon 940 continues, as shown in FIG. 9B, a value of the gauge 920 may be selectively increased and decreased to adjust a value of the gauge 920, such as to increase or decrease a value of the gauge 920 in a range of at or between a value of "0" to a value of "4", for example, as shown by the double-headed arrow 950 of FIG. 9B. The continuity of the touch input may be indicated as a long press to the timer button, such as the timer icon 940, for example.

When a touch release is detected on the timer icon 940, a movement of the gauge 920 may be stopped, and a value of a photographing timer, more particularly, a value of a self-timer, may be determined to be a value at which the gauge 920 is stopped, for example, according to exemplary embodiments.

Figure 10:
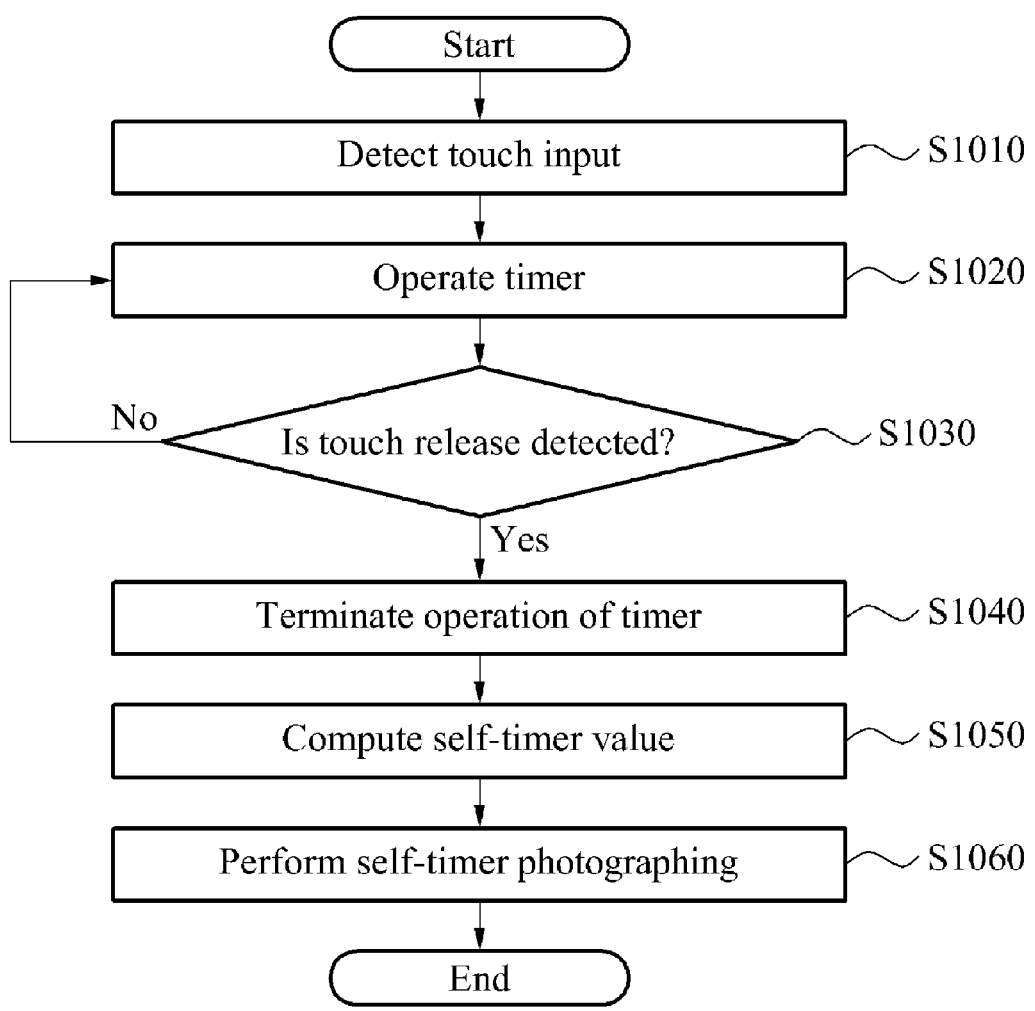
FIG. 10 is a flowchart illustrating a photographing timer control method according to exemplary embodiments of the present invention.

FIG. 10 is a flowchart illustrating a photographing timer control method as may be implemented by the photographing timer control apparatuses 100, 200, 300 and 400 of the terminals 1, 2, 3 and 4 according to exemplary embodiments of the present invention.

Referring to FIG. 10, in operation S1010, the photographing timer control apparatus, such as the photographing timer control apparatuses 100, 200, 300 and 400 of the terminals 1, 2, 3 and 4, may detect a received touch input, such as on a photographing icon. The touch input may be detected by a touch IC in an activated touch interface, such as on a screen of the display unit, such as the display units 130, 250, 350 and 470, of the terminals 1, 2, 3 and 4.

In operation S1020, the photographing timer control apparatus may operate a timer when the touch input is detected. In this regard, the timer may be used as a self-timer when a camera function of the terminals 1, 2, 3 and 4 is activated. For example, the timer may be displayed in a form of an area, such as the areas 530, 540 and 550 of FIG. 5, or in the form of a gauge, such as the gauge 630 of FIG. 6 the gauge 705 or FIG. 7, the gauge 820 of FIG. 8A to FIG. 8D, and the gauge 920 of FIG. 9A to FIG. 9B, in the activated touch interface of the terminals 1, 2, 3 and 4. When the timer operates, a value of the gauge may be selectively increased and decreased repeatedly, such as to adjust a value of the gauge.

In operation S1030, the photographing timer control apparatus may determine whether a touch release is detected. The touch release may be detected using a scheme or operation of the terminals 1, 2, 3 and 4 identical to or similar to a scheme or operation of the terminals 1, 2, 3 and 4 of detecting the touch input, such as carried out by the control unit of the terminals 1, 2, 3 and 4, such as the control units 120, 240, 340 and 460. In operation S1030, if the touch release is not detected, the process returns to operation S1020. If the touch release is is detected in operation S1030, the process proceeds to operation S1040.

In operation S1040, the photographing timer control apparatus may terminate the operation of the timer when it is determined that the touch release is detected.

In operation S1050, the photographing timer control apparatus may compute or determine a self-timer value from the timer when the operation of the timer is terminated, as described. For example, when the operation of the timer, such as the timer included in or associated with the control unit, such as the control units 120, 240, 340 and 460, is terminated, a value of the gauge may be stopped. A value indicated by the stopped gauge may be computed or determined as the self-timer value.

In operation S1060, the photographing timer control apparatus may perform self-timer photographing, such as a photographing operation of the camera of the terminals 1, 2, 3 and 4, such as cameras 170, 290, 390 and 475, based on the computed or determined self-timer value.

Figure 11:
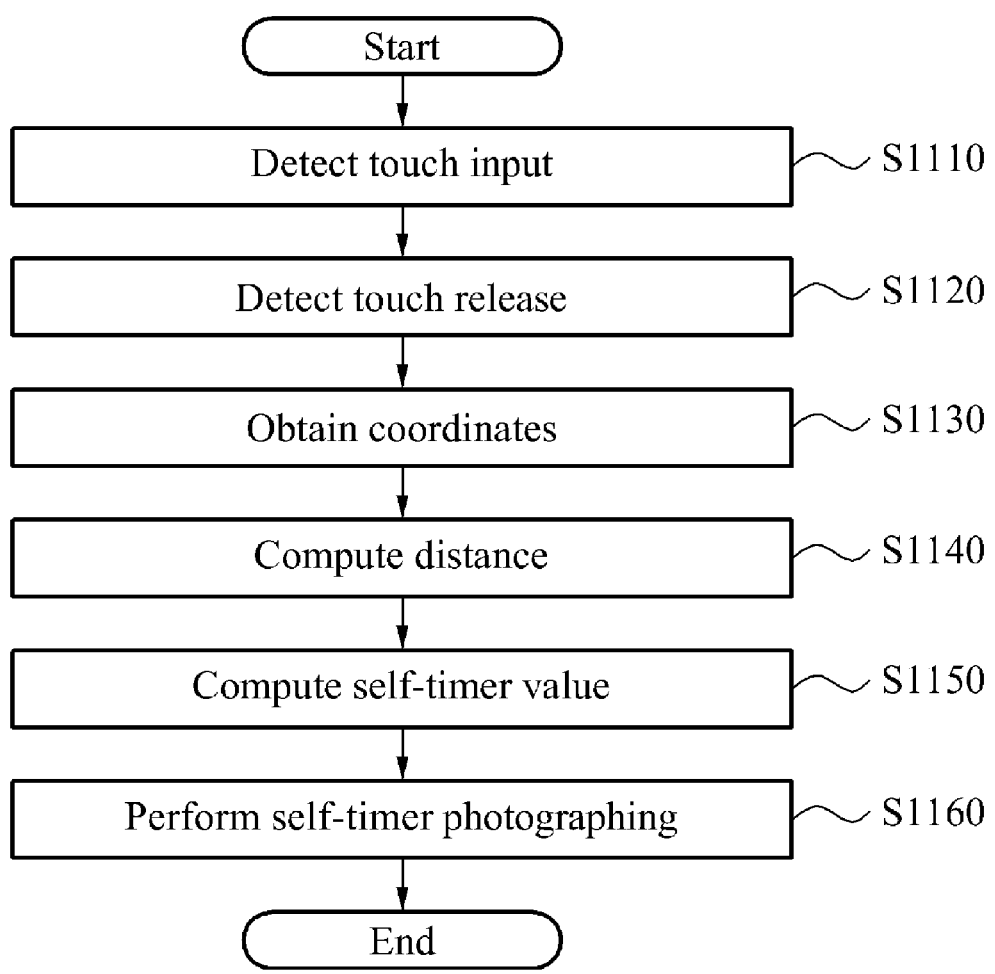
FIG. 11 is a flowchart illustrating a photographing timer control method according to exemplary embodiments of the present invention.

FIG. 11 is a flowchart illustrating a photographing timer control method as may be implemented by the photographing timer control apparatuses 100, 200, 300 and 400 of the terminals 1, 2, 3 and 4 according to exemplary embodiments of the present invention.

Referring to FIG. 11, in operation S1110, the photographing timer control apparatus may detect a received touch input, such as on a photographing icon. The received touch input may be detected by a touch IC in an activated touch interface, such as on a screen of the display unit, such as display units 130, 250, 350 and 470, of the terminals 1, 2, 3 and 4.

In operation S1120, the photographing timer control apparatus may detect a touch release. The touch release may be detected using a scheme or operation of the terminals 1, 2, 3 and 4 identical or similar to a scheme or operation of the terminal 1 of detecting the touch input, such as carried out by the control unit of the terminals 1, 2, 3 and 4, such as the control units 120, 240, 340 and 460.

In operation S1130, the photographing timer control apparatus may obtain coordinates of a location at a position on the screen of the display unit of the terminals 1, 2, 3 and 4 at which the touch input is received or provided, such as where the touch input is detected, and coordinates of a location at a position on the screen of the display unit of the terminals 1, 2, 3 and 4 at which the touch release is detected. The photographing timer control apparatus may obtain the coordinates from the touch IC in the activated touch interface, such as on the screen of the display unit, such as the display units 130, 250, 350 and 470, of the terminals 1, 2, 3 and 4.

In operation S1140, the photographing timer control apparatus may, as described, compute or determine a distance between the coordinates of the location at the position at which the touch input is provided and the coordinates of the location at the position at which the touch release is detected.

In operation S1150, the photographing timer control apparatus may, as described, compute or determine a self-timer value based on the computed or determined distance. The photographing timer control apparatus may compute or determine the self-timer value, such as based on or in proportion to or in relation to the computed or determined distance, for example.

In operation S1160, the photographing timer control apparatus may perform self-timer photographing, such as a photographing operation of the camera of the terminals 1, 2, 3 and 4, such as cameras 170, 290, 390 and 475, based on the computed or determined self-timer value.

The exemplary embodiments according to the present invention may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM discs and DVD; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to exemplary embodiments of the present invention, apparatuses and methods for increasing usability and utilization of timer photographing are promoted, such as by simplifying a setting process of relatively complex timer photographing operations, and by enhancing ease of accessibility with respect to the timer photographing operations.

According to exemplary embodiments of the present invention, apparatuses and methods for performing timer photographing in a relatively simple manner are likewise facilitated, such as by promoting ease of determining a time to be set for a self-timer based on a time during which a touch input is maintained and a distance between a position at which the touch input is provided and a position at which a touch release is detected in a touch interface. And exemplary embodiments of the present invention may also facilitate performing timer photographing operations in that a separate setting page being loaded in the touch interface in which a photographing function of a camera is activated may not be needed for timer photographing, for example.

Further, according to exemplary embodiments of the present invention, accessibility and utilization of timer photographing may be facilitated by determining a time to be set for a self-timer based on a time during which a photographing icon is pressed on a screen of a display unit of a terminal, and a position on the screen moved from a point at which the photographing icon is pressed in a touch interface in which a photographing function or operation of a camera is activated.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal to control operation of a photographing timer of a camera of the terminal, the terminal comprising:
a display unit to display a photographing icon to set a time for a photographing timer and to receive a touch input on the displayed photographing icon;
a timer value computing unit to determine a self-timer value for the photographing timer based on at least one of a touch duration of the touch input received on the photographing icon, a location at a position at which the touch input is detected, and a location at a position at which the touch input is terminated; and
a control unit to control the operation of the photographing timer of the camera of the terminal based on the determined self-timer value.

2. The terminal of claim 1, wherein:
the timer value computing unit determines the self-timer value based on a difference between the location at the position at which the touch input on the photographing icon is detected and the location at the position at which the touch input on the photographing icon is terminated, wherein the location at the position at which the touch input on the photographing icon is terminated comprises a location at a position at which at least one of a touch release of the touch input is detected and a touch drag is terminated.

3. The terminal of claim 1, wherein
the timer value computing unit determines the self-timer value corresponding to a touch drag of the photographic icon from a location at a first position to a location at a second position.

4. The terminal of claim 1, further comprising
a gauge setting unit to set an initial value of a displayed gauge to indicate the self-timer value; and
a gauge speed control unit to control a speed at which a value of the gauge as the self-timer value is selectively increased and decreased from the initial value of the gauge.

5. The terminal of claim 4, wherein:
the gauge setting unit sets the initial value of the gauge as a difference between a time at which the touch input is detected and a time at which a touch release of the touch input on the photographing icon is detected; and
the gauge speed control unit controls a speed at which the value of the gauge is selectively increased and decreased from the initial value of the gauge based on a distance between coordinates of the location at the position at which the touch input on the photographing icon is detected and coordinates of the location at the position at which the touch release on the photographing icon is detected.

6. The terminal of claim 4, wherein
the gauge setting unit sets a time during which a touch drag on the photographing icon is maintained as the initial value of the gauge; and
the timer value computing unit determines a value of the gauge when stopped at a point in time at which the touch drag is terminated as the self-timer value.

7. The terminal of claim 1, wherein
the timer value computing unit determines a value of a displayed gauge as the self-timer value.

8. The terminal of claim 1, further comprising:
a coordinate obtaining unit to determine coordinates of the location at the position at which the touch input on the photographing icon is detected and coordinates of a location at a position at which at least one of a touch release terminating the touch input is detected and a touch drag on the photographing icon is terminated; and
a distance computing unit to determine a distance between the coordinates of the location at the position at which the touch input is detected and the coordinates of the location at the position at which at least one of the touch release terminating the touch input is detected and the touch drag is terminated,
wherein the timer value computing unit determines the self-timer value based on the determined distance.

9. The terminal of claim 8, wherein
the self-timer value is selectively increased or decreased based on the determined distance.

10. The terminal of claim 1, further comprising:
an input time obtaining unit to determine a time at which the touch input on the photographing icon is detected and a time at which at least one of a touch release terminating the touch input on the photographing icon is detected and a touch drag on the photographing icon is terminated; and
an input time computing unit to determine the touch duration of the touch input based on the determined time at which the touch input on the photographing icon is detected and the determined time at which at least one of the touch release terminating the touch input on the photographing icon is detected and the touch drag on the photographing icon is terminated, wherein the timer value computing unit determines the self-timer value based on the determined touch duration.

11. The terminal of claim 10, wherein the determined self-timer value selectively increases and decreases based on the determined touch duration.

12. The terminal of claim 1, wherein:
the display unit displays at least one of a gauge indicating a self-timer value and a number corresponding to the self-timer value; and
the display unit displays a time to count down from the determined self-timer value.

13. A method for controlling operation of a photographing timer of a camera of a terminal, the method comprising:
displaying a photographing icon for a photographing timer;
determining a touch duration of a touch input received on the photographic icon;
determining a location at a position at which the touch input is detected and a location at a position at which the touch input on the photographing icon is terminated; and
determining a self-timer value for the photographing timer based on at least one of the determined touch duration, the determined location at the position at which the touch input is detected, and the determined location at the position at which the touch input is terminated.

14. The method of claim 13, further comprising:
controlling the photographing timer operation of the terminal based on the determined self-timer value.

15. The method of claim 13, wherein determining the self-timer value further comprises:
determining a difference between the location at the position at which the touch input on the photographing icon is detected and the location at the position at which the touch input on the photographing icon is terminated.

16. The method of claim 13, further comprising
setting a displayed gauge to an initial value to indicate the self-timer value;
controlling a speed at which a value of the gauge as the self-timer value is selectively increased and decreased from the initial value of the gauge;
determining a value of the gauge when stopped at a point in time as the self-timer value.

17. The method of claim 13, wherein determining the self-timer value further comprises:
determining coordinates of the location at the position at which the touch input on the photographing icon is detected and coordinates of a location at a position at which at least one of a touch release terminating the touch input is detected and a touch drag on the photographing icon is terminated; and
determining a distance between the coordinates of the location at the position at which the touch input is detected and the coordinates of the location at the position at which at least one of the touch release terminating the touch input is detected and the touch drag is terminated,
wherein the determined self-timer value is based on the determined distance.

18. The method of claim 17, further comprising:
selectively increasing and decreasing the self-timer value based on the determined distance.

19. The method of claim 13, wherein determining the self-timer value further comprises:
determining a time at which the touch input on the photographing icon is detected and a time at which at least one of a touch release terminating the touch input on the photographing icon is detected and a touch drag on the photographing icon is terminated; and
determining the touch duration of the touch input based on the determined time at which the touch input on the photographing icon is detected and the determined time at which at least one of the touch release terminating the touch input on the photographing icon is detected and the touch drag on the photographing icon is terminated,
wherein the determined self-timer value is based on the determined touch duration.

20. The method of claim 19, further comprising:
selectively increasing and decreasing the self-timer value based on the determined touch duration.

21. The method of claim 13, further comprising:
displaying at least one of a gauge indicating the self-timer value and a number corresponding to the self-timer value; and
displaying a time to count down from the determined self-timer value.

22. The method of claim 13, wherein determining the self-timer value further comprises:
determining a direction from the location at the position at which the touch input is detected to the location at the position at which the touch input on the photographing icon is terminated,
wherein the determined self-timer value is based on the determined direction.

23. The method of claim 13, wherein determining the self-timer value further comprises:
mapping the self-timer value to an area in which the touch input on the photographing icon is terminated,
wherein the determined self-timer value is based on the area in which the touch input is terminated.

24. A method for controlling operation of a photographing timer of a camera of a terminal, the method comprising:
detecting a received touch input on a photographing icon to set a time for a photographing timer;
detecting a touch release of the touch input on the photographing icon;
obtaining coordinates of a location at a position at which the touch input is detected and coordinates of the location at the position at which the touch release is detected;
determining a distance between the obtained coordinates of the location at the position at which the touch input is detected and the obtained coordinates of the location at the position at which the touch release is detected; and
determining a self-timer value to control the operation of the photographing timer of the camera of the terminal based on the determined distance.

25. A method for controlling operation of a photographing timer of a camera of a terminal, the method comprising:
detecting a received touch input on a photographing icon to set a time for a photographing timer;
operating a timer when the touch input on the photographing icon is detected;
determining if a touch release of the touch input on the photographing icon is detected;
terminating the operation of the timer when it is determined that the touch release of the touch input on the photographing icon is detected; and
determining a self-timer value from the timer corresponding to a value of the timer when the operation of the timer is terminated to control the operation of the photographing timer of the camera of the terminal based on the determined self-timer value.

26. The terminal of claim 1, wherein the touch input received on the photographing icon is a single touch input.

27. The terminal of claim 1, wherein the photographing icon is an icon to perform a camera operation of the terminal.

* * * * *